(12) United States Patent
Sullivan et al.

(10) Patent No.: US 6,827,658 B2
(45) Date of Patent: Dec. 7, 2004

(54) GOLF BALLS COMPRISING HIGHLY-NEUTRALIZED ACID POLYMERS

(75) Inventors: Michael J Sullivan, Barrington, RI (US); Herbert C. Boehm, Norwell, MA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 10/357,582

(22) Filed: Feb. 4, 2003

(65) Prior Publication Data

US 2003/0144082 A1 Jul. 31, 2003

Related U.S. Application Data

(63) Continuation of application No. 10/118,719, filed on Apr. 9, 2002, now Pat. No. 6,756,436.
(60) Provisional application No. 60/301,046, filed on Jun. 26, 2001.

(51) Int. Cl.[7] .............................................. A63B 37/06
(52) U.S. Cl. ....................................................... 473/374
(58) Field of Search ................................ 473/351, 367, 473/368, 376, 370, 371, 377, 374

(56) References Cited

U.S. PATENT DOCUMENTS

| | | | |
|---|---|---|---|
| 726,471 A * | 4/1903 | Smith .......................... | 473/363 |
| 5,306,760 A | 4/1994 | Sullivan ....................... | 524/400 |
| 5,312,857 A | 5/1994 | Sullivan ....................... | 524/400 |
| 5,688,191 A | 11/1997 | Cavallaro et al. ............ | 473/373 |
| 5,789,475 A | 8/1998 | Chen ........................... | 524/300 |
| 5,803,831 A | 9/1998 | Sullivan et al. .............. | 473/374 |
| 5,836,834 A * | 11/1998 | Masutani et al. ............ | 473/374 |
| 5,902,855 A | 5/1999 | Sullivan ....................... | 525/221 |
| 5,973,046 A | 10/1999 | Chen et al. .................. | 524/300 |
| 6,100,321 A | 8/2000 | Chen ........................... | 524/400 |
| 6,329,458 B1 | 12/2001 | Takesue et al. .............. | 524/400 |
| 6,485,378 B1 * | 11/2002 | Boehm ........................ | 473/374 |
| 6,595,874 B2 * | 7/2003 | Sullivan et al. .............. | 473/374 |
| 2001/0018375 A1 | 8/2001 | Hayashi et al. .............. | 473/371 |
| 2001/0019971 A1 | 9/2001 | Hayashi et al. .............. | 473/371 |
| 2002/0013421 A1 | 1/2002 | Takesue et al. .............. | 524/418 |
| 2002/0037968 A1 | 3/2002 | Chen ........................... | 525/194 |
| 2002/0055400 A1 | 5/2002 | Higuchi et al. .............. | 473/374 |
| 2002/0061793 A1 | 5/2002 | Higuchi et al. .............. | 473/371 |
| 2002/0091188 A1 | 7/2002 | Statz et al. ................... | 524/400 |
| 2002/0099120 A1 | 7/2002 | Takesue et al. .............. | 524/394 |
| 2002/0111407 A1 | 8/2002 | Takesue et al. .............. | 524/322 |
| 2002/0177492 A1 | 11/2002 | Watanabe et al. ........... | 473/371 |

FOREIGN PATENT DOCUMENTS

| | | |
|---|---|---|
| WO | WO 00/23519 | 4/2000 |
| WO | WO 01/29129 A1 | 4/2001 |

* cited by examiner

Primary Examiner—Raeann Gorden
(74) Attorney, Agent, or Firm—William B. Lacy

(57) ABSTRACT

A golf ball comprising an inner core formed of a first material and comprising i) a central portion; and ii) a plurality of spaced projections extending radially outward from the central portion forming gaps between each projection, and each projection having an enlarged free end and a substantially conical shape; an outer core formed of a second material, said second material being disposed within the gaps and the recesses to form a core; and a cover layer; wherein at least one of the first and second materials comprises a polymer containing an acid group neutralized by an organic acid or a salt thereof, the organic acid or salt thereof being present in an amount sufficient to neutralize the polymer by at least about 100%.

26 Claims, 6 Drawing Sheets

GOLF BALLS COMPRISING HIGHLY-NEUTRALIZED ACID POLYMERS

CROSS-REFERENCE TO RELATED APPLICATION

This application is a continuation of U.S. Application Ser. No. 10/118,719, filed Apr. 9, 2002, now U.S. Pat. No. 6,756,436, which is a non-provisional application claiming priority to U.S. Provisional Application Ser. No. 60/301,046, filed Jun. 26, 2001.

FIELD OF THE INVENTION

The present invention is directed to golf ball compositions and, in particular, polymer compositions including highly-neutralized polymers and blends thereof.

BACKGROUND OF THE INVENTION

Conventional golf balls can be divided into two general classes: solid and wound. Solid golf balls include one-piece, two-piece (i.e., solid core and a cover), and multi-layer (i.e., solid core of one or more layers and/or a cover of one or more layers) golf balls. Wound golf balls typically include a solid, hollow, or fluid-filled center, surrounded by a tensioned elastomeric material, and a cover. It is also possible to surround a hollow or fluid-filled center with a plurality of solid layers. Solid balls have traditionally been considered longer and more durable than wound balls, but many solid constructions lack the "feel" provided by the wound construction.

More recently, by altering ball construction and composition, manufacturers have been able to vary a wide range of playing characteristics, such as compression, velocity, "feel," and spin, optimizing each or all be optimized for various playing abilities. In particular, a variety of core and cover layer(s) constructions, such as multi-layer balls having dual cover layers and/or dual core layers, have been investigated and now allow many non-wound balls to exhibit characteristics previously maintainable in a solid-construction golf ball. These golf ball layers are typically constructed with a number of polymeric compositions and blends, including polybutadiene rubber, polyurethanes, polyamides, and ethylene-based ionomers.

Ionomers, and in particular ethylene α,β-ethylenically unsaturated carboxylic acid copolymers or a melt processible ionomer thereof, are a preferred polymer for many golf ball layers. One problem encountered with the use of ionomers as stiff layers, however, is the unprocessability of the material as the percent of neutralization of the acid group increases. Ionomers are stiffened by increasing the amount of neutralization by a metal cation or a salt thereof. Once the percent of neutralization is greater than about 60% (depending on metal cation selected), the melt flow of the ionomer becomes too low and the ease of processablilty decreases or disappears altogether. For tri-valent cations, the percent neutralization at which the polymer becomes unprocessable can be significantly lower.

There is a need, therefore, for ionomer compositions that are neutralized at high percentages, but in a manner that still allows resultant polymer compositions to be processible. The present invention describes such compositions and there use in a variety of golf ball core and cover layers.

SUMMARY OF THE INVENTION

The present invention is directed to a golf ball comprising a core comprised of a polymer containing an acid group neutralized by an organic acid or a salt thereof, the organic acid or salt thereof being present in an amount sufficient to neutralize the polymer by at least about 80%, wherein the core has a first Shore D hardness, a compression of no greater than about 80, and a diameter of no less than about 1.53 inches; and a cover comprised of a material having a second Shore D hardness at least 10 points less than the first hardness.

Additionally, the present invention is also directed to a golf ball comprising a core comprised of a polymer containing an acid group neutralized by an organic acid or a salt thereof, the organic acid or salt thereof being present in an amount sufficient to neutralize the polymer by at least about 80%, wherein the core has a first Shore D hardness, a compression of no greater than about 80, and a diameter of no less than about 1.53 inches; and a cover comprised of a material having a second Shore D hardness at least 10 points greater than the first hardness.

In one embodiment of the above, the polymer comprises ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures thereof.

In another embodiment of the above, the organic acid is selected from the group consisting of aliphatic organic acids, aromatic organic acids, saturated mono-functional organic acids, unsaturated mono-functional organic acids, and multi-unsaturated mono-functional organic acids. Preferably, the salt of organic acids comprise the salts of barium, lithium, sodium, zinc, bismuth, chromium, cobalt, copper, potassium, strontium, titanium, tungsten, magnesium, cesium, iron, nickel, silver, aluminum, tin, calcium, stearic, bebenic, erucic, oleic, linoelic, dimerized derivatives, and mixtures thereof.

In another embodiment of the above, the core further comprises a second polymer component in an amount sufficient to reduce the core compression to less than or equal to about 70. Further, preferably the second polymer component has a Shore D hardness of about 40 or greater. It is also preferred that the second polymer component comprises ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, cationic ionomers, and mixtures thereof.

In one embodiment of the above, the organic acid or salt thereof is present in an amount sufficient to neutralize the polymer by at least about 90%. In a preferred embodiment, the organic acid or salt thereof is present in an amount sufficient to neutralize the polymer by at least about 100%. Further, at least one of the polymer or second polymer component is partially neutralized by a metal cation.

In another embodiment, the core has a diameter of about 1.58 inches or greater. The cover may be comprised of a castable reactive liquid material or the cover is cast or reaction injection molded over the core. Preferably, the cover is comprised of a polyurethane.

The present invention is also directed to a golf ball comprising a core comprising a center and an outer layer, the center being comprised of a thermoset rubber and the outer layer being comprised of polymer neutralized with an organic acid or a salt thereof, the organic acid or salt thereof being present in an amount greater than about 10 weight percent such that the polymer is fully neutralized, wherein the outer layer has a first Shore D hardness and the core has a compression of less than or equal to about 90 and a diameter of about 1.53 inches or greater; and a cover being comprised of a castable reactive liquid material having a second Shore D hardness being at least 10 points less than the first hardness.

In one embodiment, the outer layer further comprises a softening copolymer in sufficient weight percentage to reduce the core compression to less than or equal to about 70. In another embodiment, the core has a diameter of about 1.58 inches or greater. Preferably, the cover is comprised of a castable reactive liquid material. The cover may also be cast or reaction injection molded over the core. It is preferred that the cover is comprised of a cast polyurethane. In another embodiment, the golf ball further comprises an intermediate layer being comprised of an ionomer having a Shore D hardness that is at least 10 greater than the first Shore D hardness.

In an alternative embodiment, the core is surface treated by plasma treatment, corona discharge, chemical treatment or mechanically treated.

The present invention is also directed to a golf ball comprising a core comprised of a thermoset rubber having a diameter of about 0.5 to 1.55 inches; a cover disposed over the core having a shore D hardness of about 55 or less; and an intermediate layer being comprised of a polymer neutralized by an organic acid or a salt thereof, the an organic acid or a salt thereof being present in an amount sufficient to neutralize the polymer by at least about 100%.

Preferably, the cover is comprised or a polyurethane. In one embodiment, the intermediate layer has a Shore D hardness of at least about 62. In another embodiment, the cover has a thickness of about 0.04 or less. In still another embodiment, the core has a compression of about 70 or less and a diameter of at least 1.4 inches.

The present invention is also directed to a golf ball comprising a center comprised of a liquid, the center having a diameter of about 1.0 inches or less; an intermediate layer being comprised of a polymer neutralized with an organic acid or a salt thereof, the an organic acid or a salt thereof being present in an amount greater than about 10 weight percent such that the polymer is saturated, the intermediate layer being disposed about the center to form a core; and a cover disposed over the core.

Preferably, the cover is comprised of a polyurethane. Additionally, the core is further comprised of an outer layer comprised of a thermoset rubber disposed between the intermediate layer and the cover. In another embodiment, the outer layer has a hardness that is at least 5 points less than a hardness of the intermediate layer.

DETAILED DESCRIPTION OF THE INVENTION

Figure 1:
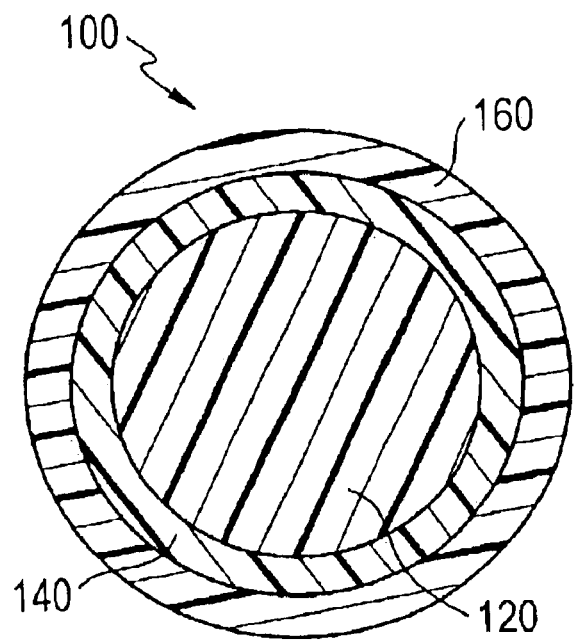
FIG. 1 is one embodiment of a golf ball of the present invention.

The present invention is directed to highly-neutralized polymers and blends thereof ("HNP") for the use in golf equipment, preferably in ball cores, intermediate layers, and/or covers. The acid moieties of the HNP's, typically ethylene-based ionomers, are preferably neutralized greater than about 70%, more preferably greater than about 90%, and most preferably at least about 100%. The HNP's can be also be blended with a second polymer component, which, if containing an acid group, may be neutralized in a conventional manner, by the organic fatty acids of the present invention, or both. The second polymer component, which may be partially or fully neutralized, preferably comprises ionomeric copolymers and terpolymers, ionomer precursors, thermoplastics, polyamides, polycarbonates, polyesters, polyurethanes, polyureas, thermoplastic elastomers, polybutadiene rubber, balata, metallocene-catalyzed polymers (grafted and non-grafted), single-site polymers, high-crystalline acid polymers, cationic ionomers, and the like. HNP polymers typically have a material hardness of between about 20 and about 80 Shore D, and a flexural modulus of between about 3,000 psi and about 200,000 psi.

In one embodiment of the present invention the HNP's are ionomers and/or their acid precursors that are preferably neutralized, either filly or partially, with organic acid copolymers or the salts thereof. The acid copolymers are preferably α-olefin, such as ethylene, $C_{3-8}$ α,β-ethylenically unsaturated carboxylic acid, such as acrylic and methacrylic acid, copolymers. They may optionally contain a softening monomer, such as alkyl acrylate and alkyl methacrylate, wherein the alkyl groups have from 1 to 8 carbon atoms.

The acid copolymers can be described as E/X/Y copolymers where E is ethylene, X is an α,β-ethylenically unsaturated carboxylic acid, and Y is a softening comonomer. In a preferred embodiment, X is acrylic or methacrylic acid and Y is a $C_{1-8}$ alkyl acrylate or methacrylate ester. X is preferably present in an amount from about 1 to about 35 weight percent of the polymer, more preferably from about 5 to about 30 weight percent of the polymer, and most preferably from about 10 to about 20 weight percent of the polymer. Y is preferably present in an amount from about 0 to about 50 weight percent of the polymer, more preferably from about 5 to about 25 weight percent of the polymer, and most preferably from about 10 to about 20 weight percent of the polymer.

Specific acid-containing ethylene copolymers include, but are not limited to, ethylene/acrylic acid/n-butyl acrylate, ethylene/methacrylic acid/n-butyl acrylate, ethylene/methacrylic acid/iso-butyl acrylate, ethylene/acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate. Preferred acid-containing ethylene copolymers include, ethylene/methacrylic acid/n-butyl acrylate, ethylene/acrylic acid/n-butyl acrylate, ethylene/methacrylic acid/methyl acrylate, ethylene/acrylic acid/ethyl acrylate, ethylene/methacrylic acid/ethyl acrylate, and ethylene/acrylic acid/methyl acrylate copolymers. The most preferred acid-containing ethylene copolymers are, ethylene/(meth) acrylic acid/n-butyl, acrylate, ethylene/(meth)acrylic acid/ethyl acrylate, and ethylene/(meth) acrylic acid/methyl acrylate copolymers.

Ionomers are typically neutralized with a metal cation, such as Li, Na, Mg, or Zn. It has been found that by adding sufficient organic acid or salt of organic acid, along with a suitable base, to the acid copolymer or ionomer, however, the ionomer can be neutralized, without losing processability, to a level much greater than for a metal cation. Preferably, the acid moieties are neutralized greater than about 80%, preferably from 90–100%, most preferably 100% without losing processability. This accomplished by melt-blending an ethylene α,β-ethylenically unsaturated carboxylic acid copolymer, for example, with an organic acid or a salt of organic acid, and adding a sufficient amount of a cation source to increase the level of neutralization of all the acid moieties (including those in the acid copolymer and in the organic acid) to greater than 90%, (preferably greater than 100%).

The organic acids of the present invention are aliphatic, mono-functional (saturated, unsaturated, or multi-unsaturated) organic acids. Salts of these organic acids may also be employed. The salts of organic acids of the present invention include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, bebenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending).

The ionomers of the invention may also be partially neutralized with metal cations. The acid moiety in the acid copolymer is neutralized about 1 to about 100%, preferably at least about 40 to about 100%, and more preferably at least about 90 to about 100%, to form an ionomer by a cation such as lithium, sodium, potassium, magnesium, calcium, barium, lead, tin, zinc, aluminum, or a mixture thereof.

The acid copolymers of the present invention are prepared from 'direct' acid copolymers, copolymers polymerized by adding all monomers simultaneously, or by grafting of at least one acid-containing monomer onto an existing polymer.

Thermoplastic polymer components, such as copolyetheresters, copolyesteresters, copolyetheramides, elastomeric polyolefins, styrene diene block copolymers and their hydrogenated derivatives, copolyesteramides, thermoplastic polyurethanes, such as copolyetherurethanes, copolyesterurethanes, copolyureaurethanes, epoxy-based polyurethanes, polycaprolactone-based polyurethanes, polyureas, and polycarbonate-based polyurethanes fillers, and other ingredients, if included, can be blended in either before, during, or after the acid moieties are neutralized, thermoplastic polyurethanes.

The copolyetheresters are comprised of a multiplicity of recurring long chain units and short chain units joined head-to-tail through ester linkages, the long chain units being represented by the formula:

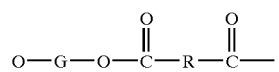

and the short chain units being represented by the formula:

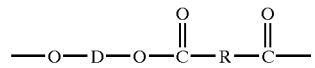

where G is a divalent radical remaining after the removal of terminal hydroxyl groups from a poly (alkylene oxide) glycol having a molecular weight of about 400–8000 and a carbon to oxygen ratio of about 2.0–4.3; R is a divalent radical remaining after removal of hydroxyl groups from a diol having a molecular weight less than about 250; provided said short chain ester units amount to about 15–95 percent by weight of said copolyetherester. The preferred copolyetherester polymers are those where the polyether segment is obtained by polymerization of tetrahydrofuran and the polyester segment is obtained by polymerization of tetramethylene glycol and phthalic acid. For purposes of the invention, the molar ether:ester ratio can vary from 90:10 to 10:80; preferably 80:20 to 60:40; and the Shore D hardness is less than 70; preferably less than about 40.

The copolyetheramides are comprised of a linear and regular chain of rigid polyamide segments and flexible polyether segments, as represented by the general formula:

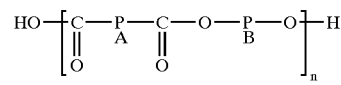

wherein PA is a linear saturated aliphatic polyamide sequence formed from a lactam or amino acid having a hydrocarbon chain containing 4 to 14 carbon atoms or from an aliphatic $C_6$–$C_8$ diamine, in the presence of a chain-limiting aliphatic carboxylic diacid having 4–20 carbon atoms; said polyamide having an average molecular weight between 300 and 15,000; and PB is a polyoxyalkylene sequence formed from linear or branched aliphatic polyoxyalkylene glycols, mixtures thereof or copolyethers derived therefrom, said polyoxyalkylene glycols having a molecular weight of less than or equal to 6000; and n indicates a sufficient number of repeating units so that said polyetheramide copolymer has an intrinsic viscosity of from about 0.6 to about 2.05. The preparation of these polyetheramides comprises the step of reacting a dicarboxylic polyamide, the COOH groups of which are located at the chain ends, with a polyoxyalkylene glycol hydroxylated at the chain ends, in the presence of a catalyst such as a tetra-alkyl ortho titanate having the general formula $Ti(OR)_x$ wherein R is a linear branched aliphatic hydrocarbon radical having 1 to 24 carbon atoms. Again, the more polyether units incorporated into the copolyetheramide, the softer the polymer. The ether:amide ratios are as described above for the ether:ester ratios, as is the Shore D hardness.

The elastomeric polyolefins are polymers composed of ethylene and higher primary olefins such as propylene, hexene, octene, and optionally 1,4-hexadiene and or ethylidene norbornene or norbomadiene. The elastomeric polyolefins can be optionally functionalized with maleic anhydride, epoxy, hydroxy, amine, carboxylic acid, sulfonic acid, or thiol groups.

Thermoplastic polyurethanes are linear or slightly chain branched polymers consisting of hard blocks and soft elastomeric blocks. They are produced by reacting soft hydroxy terminated elastomeric polyethers or polyesters with diisocyanates, such as methylene diisocyanate ("MDI"), p-phenylene diisocyanate ("PPDI"), or toluene diisocyanate ("TDI"). These polymers can be chain extended with glycols, secondary diamines, diacids, or amino alcohols. The reaction products of the isocyanates and the alcohols are called urethanes and these blocks are relatively hard and high melting. These hard high melting blocks are responsible for the thermoplastic nature of the polyurethanes.

Block styrene diene copolymers and their hydrogenated derivatives are composed of polystyrene units and polydiene units. They may also be functionalized with moieties such as OH, $NH_2$, epoxy, COOH, and anhydride groups. The polydiene units are derived from polybutadiene, polyisoprene units or copolymers of these two. In the case of the copolymer it is possible to hydrogenate the polyolefin to give a saturated rubbery backbone segments. These materials are usually referred to as SBS, SIS, or SEBS thermoplastic elastomers and they can also be functionalized with maleic anhydride.

Grafted metallocene-catalyzed polymers are also useful for blending with the HNP's of the present invention. The grafted metallocene-catalyzed polymers, while conventionally neutralized with metal cations, may also be neutralized, either partially for fully, with organic acids or salts thereof and an appropriate base. Grafted metallocene-catalyzed polymers useful, such as those disclosed in U.S. Pat. Nos. 5,703,166; 5,824,746; 5,981,658; and 6,025,442, which are incorporated herein by reference, in the golf balls of the invention are available in experimental quantities from DuPont under the tradenames SURLYN® NMO 525D, SURLYN® NMO 524D, and SURLYN® NMO 499D, all formerly known as the FUSABOND® family of polymers, or may be obtained by subjecting a non-grafted metallocene-catalyzed polymer to a post-polymerization reaction to provide a grafted metallocene-catalyzed polymer with the desired pendant group or groups. Examples of metallocene-catalyzed polymers to which functional groups may be grafted for use in the invention include, but are not limited to, homopolymers of ethylene and copolymers of ethylene and a second olefin, preferably, propylene, butene, pentene, hexene, heptene, octene, and norbornene. Generally, the invention includes golf balls having at least one layer comprising at least one grafted metallocene-catalyzed polymer or polymer blend, where the grafted metallocene-catalyzed polymer is produced by grafting a functional group onto a metallocene-catalyzed polymer having the formula:

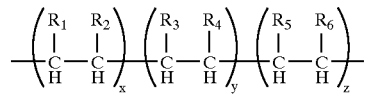

wherein $R_1$ is hydrogen, branched or straight chain alkyl such as methyl, ethyl, propyl, butyl, pentyl, hexyl, heptyl, and octyl, carbocyclic, or aromatic; $R_2$ is hydrogen, lower alkyl including $C_1$–$C_5$; carbocyclic, or aromatic; $R_3$ is hydrogen, lower alkyl including $C_1$–$C_5$, carbocyclic, or aromatic; $R_4$ is selected from the group consisting of H, $C_nH_{2n+1}$, where n=1 to 18, and phenyl, in which from 0 to 5 H within $R_4$ can be replaced by substituents COOH, $SO_3H$, $NH_2$, F, Cl, Br, I, OH, SH, silicone, lower alkyl esters and lower alkyl ethers, with the proviso that $R_3$ and $R_4$ can be combined to form a bicyclic ring; $R_5$ is hydrogen, lower alkyl including $C_1$–$C_5$, carbocyclic, or aromatic; $R_6$ is hydrogen, lower alkyl including $C_1$–$C_5$, carbocyclic, or aromatic; and wherein x, y and z are the relative percentages of each co-monomer. X can range from about 1 to 99 percent or more preferably from about 10 to about 70 percent and most preferred, from about 10 to 50 percent. Y can be from 99 to 1 percent, preferably, from 90 to 30 percent, or most preferably, 90 to 50 percent. Z can range from about 0 to about 49 percent. One of ordinary skill in the art would understand that if an acid moiety is present as a ligand in the above polymer that it may be neutralized up to 100% with an organic fatty acid as described above.

Metallocene-catalyzed copolymers or terpolymers can be random or block and may be isotactic, syndiotactic, or atactic. The pendant groups creating the isotactic, syndiotactic, or atactic polymers are chosen to determine the interactions between the different polymer chains making up the resin to control the final properties of the resins used in golf ball covers, centers, or intermediate layers. As will be clear to those skilled in the art, grafted metallocene-catalyzed polymers useful in the invention that are formed from metallocene-catalyzed random or block copolymers or terpolymers will also be random or block copolymers or terpolymers, and will have the same tacticity of the metallocene-catalyzed polymer backbone.

As used herein, the term "phrase branched or straight chain alkyl" means any substituted or unsubstituted acyclic carbon-containing compounds. Examples of alkyl groups include lower alkyl, for example, methyl, ethyl, n-propyl, iso-propyl, n-butyl, iso-butyl or t-butyl; upper alkyl, for example, octyl, nonyl, decyl, and the like; and lower alkylene, for example, ethylene, propylene, butylene, pentene, hexene, octene, norbornene, nonene, decene, and the like.

In addition, such alkyl groups may also contain various substituents in which one or more hydrogen atoms has been replaced by a functional group. Functional groups include, but are not limited to hydroxyl, amino, carboxyl, sulfonic amide, ester, ether, phosphates, thiol, nitro, silane and halogen (fluorine, chlorine, bromine and iodine), to mention but a few.

As used herein, the term "substituted and unsubstituted carbocyclic" means cyclic carbon-containing compounds, including, but not limited to cyclopentyl, cyclohexyl, cycloheptyl, and the like. Such cyclic groups may also contain various substituents in which one or more hydrogen atoms has been replaced by a functional group. Such functional groups include those described above, and lower alkyl groups having from 1–28 carbon atoms. The cyclic groups of the invention may further comprise a heteroatom.

As mentioned above, $R_1$ and $R_2$ can also represent any combination of alkyl, carbocyclic or aryl groups, for example, 1-cyclohexylpropyl, benzyl cyclohexylmethyl, 2-cyclohexylpropyl, 2,2-methylcyclohexylpropyl, 2,2-methylphenylpropyl, and 2,2-methylphenylbutyl.

Non-grafted metallocene-catalyzed polymers useful in the present invention are commercially available under the trade name AFFINITY® polyolefin plastomers and ENGAGE® polyolefin elastomers commercially available from Dow Chemical Company and DuPont-Dow. Other commercially available metallocene-catalyzed polymers can be used, such as EXACT®, commercially available from Exxon and INSIGHT®, commercially available from Dow. The EXACT® and INSIGHT® line of polymers also have novel rheological behavior in addition to their other properties as a result of using a metallocene catalyst technology. Metallocene-catalyzed polymers are also readily available from Sentinel Products Corporation of Hyannis, Mass., as foamed sheets for compression molding.

Monomers useful in the present invention include, but are not limited to, olefinic monomers having, as a functional group, sulfonic acid, sulfonic acid derivatives, such as chlorosulfonic acid, vinyl ethers, vinyl esters, primary, secondary, and tertiary amines, mono-carboxylic acids, dicarboxylic acids, partially or fully ester-derivatized mono-carboxylic and dicarboxylic acids, anhydrides of dicarboxylic acids, and cyclic imides of dicarboxylic acids.

In addition, metallocene-catalyzed polymers may also be functionalized by sulfonation, carboxylation, or the addition of an amine or hydroxy group. Metallocene-catalyzed polymers functionalized by sulfonation, carboxylation, or the addition of a hydroxy group may be converted to anionic ionomers by treatment with a base. Similarly, metallocene-catalyzed polymers functionalized by the addition of an amine may be converted to cationic ionomers by treatment with an alkyl halide, acid, or acid derivative.

The most preferred monomer is maleic anhydride, which, once attached to the metallocene-catalyzed polymer by the post-polymerization reaction, may be further subjected to a reaction to form a grafted metallocene-catalyzed polymer containing other pendant or functional groups. For example, reaction with water will convert the anhydride to a dicarboxylic acid; reaction with ammonia, alkyl, or aromatic amine forms an amide; reaction with an alcohol results in the formation of an ester; and reaction with base results in the formation of an anionic ionomer.

The HNP's of the present invention may also be blended with single-site and metallocene catalysts and polymers formed therefrom. As used herein, the term "single-site catalyst," such as those disclosed in U.S. Pat. No. 6,150,462 which is incorporated herein by reference, refers to a catalyst that contains an ancillary ligand that influences the stearic and electronic characteristics of the polymerizing site in a manner that prevents formation of secondary polymerizing species. The term "metallocene catalyst" refers to a single-site catalyst wherein the ancillary ligands are comprising substituted or unsubstituted cyclopentadienyl groups, and the term "non-metallocene catalyst" refers to a single-site catalyst other than a metallocene catalyst.

Non-metallocene single-site catalysts include, but are not limited to, the Brookhart catalyst, which has the following structure:

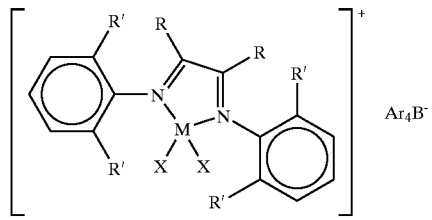

wherein M is nickel or palladium; R and R' are independently hydrogen, hydrocarbyl, or substituted hydrocarbyl; Ar is $(CF_3)_2C_6H_3$, and X is alkyl, methyl, hydride, or halide; the McConville catalyst, which has the structure:

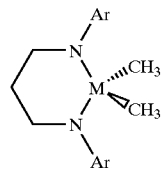

wherein M is titanium or zirconium. Iron (II) and cobalt (II) complexes with 2,6-bis(imino) pyridyl ligands, which have the structure:

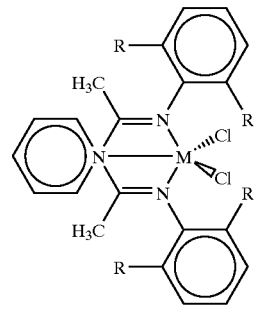

where M is the metal, and R is hydrogen, alkyl, or hydrocarbyl. Titanium or zirconium complexes with pyrroles as ligands also serve as single-site catalysts. These complexes have the structure:

where M is the metal atom; m and n are independently 1 to 4, and indicate the number of substituent groups attached to the aromatic rings; $R_m$ and $R_n$ are independently hydrogen or alkyl; and X is halide or alkyl. Other examples include diimide complexes of nickel and palladium, which have the structure:

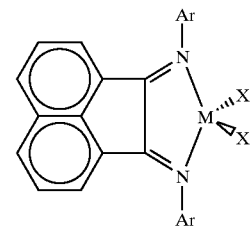

where Ar is aromatic, M is the metal, and X is halide or alkyl. Boratabenzene complexes of the Group IV or V metals also function as single-site catalysts. These complexes have the structure:

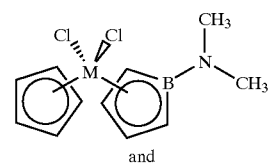

and

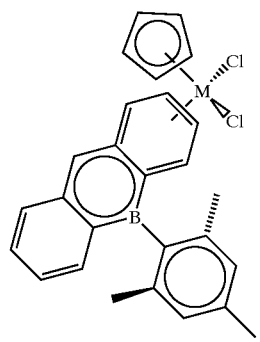

where B is boron and M is the metal atom.

As used herein, the term "single-site catalyzed polymer" refers to any polymer, copolymer, or terpolymer, and, in particular, any polyolefin polymerized using a single-site catalyst. The term "non-metallocene single-site catalyzed polymer" refers to any polymer, copolymer, or terpolymer, and, in particular, any polyolefin polymerized using a single-site catalyst other than a metallocene-catalyst. The catalysts discussed above are examples of non-metallocene single-site catalysts. The term "metallocene catalyzed polymer" refers to any polymer, copolymer, or terpolymer, and, in particular, any polyolefin, polymerized using a metallocene catalyst.

As used herein, the term "single-site catalyzed polymer blend" refers to any blend of a single-site catalyzed polymer and any other type of polymer, preferably an ionomer, as well as any blend of a single-site catalyzed polymer with another single-site catalyzed polymer, including, but not limited to, a metallocene-catalyzed polymer.

The terms "grafted single-site catalyzed polymer" and "grafted single-site catalyzed polymer blend" refer to any single-site catalyzed polymer or single-site catalyzed polymer blend in which the single-site catalyzed polymer has been subjected to a post-polymerization reaction to graft at least one functional group onto the single-site catalyzed polymer. A "post-polymerization reaction" is any reaction that occurs after the formation of the polymer by a polymerization reaction.

The single-site catalyzed polymer, which may be grafted, may also be blended with polymers, such as non-grafted single-site catalyzed polymers, grafted single-site catalyzed polymers, ionomers, and thermoplastic elastomers. Preferably, the single-site catalyzed polymer is blended with at least one ionomer of the preset invention.

Grafted single-site catalyzed polymers useful in the golf balls of the invention may be obtained by subjecting a non-grafted single-site catalyzed polymer to a post-polymerization reaction to provide a grafted single-site catalyzed polymer with the desired pendant group or groups. Examples of single-site catalyzed polymers to which functional groups may be grafted for use in the invention include, but are not limited to, homopolymers of ethylene and propylene and copolymers of ethylene and a second olefin, preferably, propylene, butene, pentene, hexene, heptene, octene, and norbornene. Monomers useful in the present invention include, but are not limited to olefinic monomers having as a functional group sulfonic acid, sulfonic acid derivatives, such as chlorosulfonic acid, vinyl ethers, vinyl esters, primary, secondary, and tertiary amines, epoxies, isocyanates, mono-carboxylic acids, dicarboxylic acids, partially or fully ester derivatized mono-carboxylic and dicarboxylic acids, anhydrides of dicarboxylic acids, and cyclic imides of dicarboxylic acids. Generally, this embodiment of the invention includes golf balls having at least one layer comprising at least one grafted single-site catalyzed polymer or polymer blend, where the grafted single-site catalyzed polymer is produced by grafting a functional group onto a single-site catalyzed polymer having the formula:

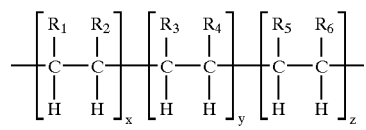

where $R_1$ is hydrogen, branched or straight chain alkyl such as methyl, ethyl, propyl, butyl, pentyl, hexyl, heptyl, and octyl, carbocyclic, aromatic or heterocyclic; $R_2$, $R_3$, $R_5$, and $R_6$ are hydrogen, lower alkyl including $C_1$–$C_5$, carbocyclic, aromatic or heterocyclic; $R_4$ is H, $C_nH_{2n+1}$, where n=1 to 18, and phenyl, in which from 0 to 5 H within $R_4$ can be replaced by substituents such as COOH, $SO_3H$, $NH_2$, F, Cl, Br, I, OH, SH, epoxy, isocyanate, silicone, lower alkyl esters and lower alkyl ethers; also, $R_3$ and $R_4$ can be combined to form a bicyclic ring; and x, y and z are the relative percentages of each co-monomer. X can range from about 1 to about 100 percent or more preferably from 1 to 70 percent and most preferred, from about 1 to about 50 percent. Y can be from about 99 to about 0 percent, preferably, from about 9 to about 30 percent, or most preferably, about 9 to about 50 percent. Z can range from about 0 to about 50 percent. One of ordinary skill in the art would also understand that if an acid group is selected as a ligand in the above structure that it too could be neutralized with the organic fatty acids described above.

The HNP's of the present invention may also be blended with high crystalline acid copolymers and their ionomer derivatives (which may be neutralized with conventional metal cations or the organic fatty acids and salts thereof) or a blend of a high crystalline acid copolymer and its ionomer derivatives and at least one additional material, preferably an acid copolymer and its ionomer derivatives. As used herein, the term "high crystalline acid copolymer" is defined as a "product-by-process" in which an acid copolymer or its ionomer derivatives formed from a ethylene/carboxylic acid copolymer comprising about 5 to about 35 percent by weight acrylic or methacrylic acid, wherein the copolymer is polymerized at a temperature of about 130° C. to 200° C., at pressures greater than about 20,000 psi preferably greater than about 25,000 psi, more pref. from about 25,000 psi to about 50,000 psi, wherein up to about 70 percent, preferably 100 percent, of the acid groups are neutralized with a metal ion, organic fatty acids and salts thereof, or a mixture thereof. The copolymer can have a melt index ("MI") of from about 20 to about 300 g/10 min, preferably about 20 to about 200 g/10 min, and upon neutralization of the copolymer, the resulting acid copolymer and its ionomer derivatives should have an MI of from about 0.1 to about 30.0 g/10 min.

Suitable high crystalline acid copolymer and its ionomer derivatives compositions and methods for making them are disclosed in U.S. Pat. No. 5,580,927, the disclosure of which is hereby incorporated by reference in its entirety.

The high crystalline acid copolymer or its ionomer derivatives employed in the present invention are preferably formed from a copolymer containing about 5 to about 35 percent, more preferably from about 9 to about 18, most preferably about 10 to about 13 percent, by weight of acrylic acid, wherein up to about 75 percent, most preferably about 60 percent, of the acid groups are neutralized with an organic fatty acid, salt thereof, or a metal ion, such as sodium, lithium, magnesium, or zinc ion.

Generally speaking, high crystalline acid copolymer and its ionomer derivatives are formed by polymerization of their base copolymers at lower temperatures, but at equivalent pressures to those used for forming a conventional acid copolymer and its ionomer derivatives. Conventional acid copolymers are typically polymerized at a polymerization temperature of from at least about 200° C. to about 270° C., preferably about 220° C., and at pressures of from about 23,000 to about 30,000 psi. In comparison, the high crystalline acid copolymer and its ionomer derivatives employed in the present invention are produced from acid copolymers that are polymerized at a polymerization temperature of less than 200° C., and preferably from about 130° C. to about 200° C., and at pressures from about 20,000 to about 50,000 psi.

The HNP's of the present invention may also be blended with cationic ionomers, such as those disclosed in U.S. Pat. No. 6,193,619 which is incorporated herein by reference. In particular, cationic ionomers have a structure according to the formula:

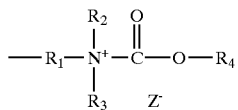

or the formula:

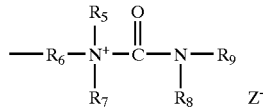

wherein $R_1$–$R_9$ are organic moieties of linear or branched chain alkyl, carbocyclic, or aryl; and Z is the negatively charged conjugate ion produced following alkylation and/or quaternization. The cationic polymers may also be quarternized up to 100% by the organic fatty acids described above.

In addition, such alkyl group may also contain various substituents in which one or more hydrogen atoms has been replaced by a functional group. Functional groups include but are not limited to hydroxyl, amino, carboxyl, amide, ester, ether, sulfonic, siloxane, siloxyl, silanes, sulfonyl, and halogen.

As used herein, substituted and unsubstituted carbocyclic groups of up to about 20 carbon atoms means cyclic carbon-containing compounds, including but not limited to cyclopentyl, cyclohexyl, cycloheptyl, and the like. Such cyclic groups may also contain various substituents in which one or more hydrogen atoms has been replaced by a functional group. Such functional groups include those described above, and lower alkyl groups as described above. The cyclic groups of the invention may further comprise a heteroatom.

The HNP's of the present invention may also be blended with polyurethane and polyurea ionomers which include anionic moieties or groups, such as those disclosed in U.S. Pat. No. 6,207,784 which is incorporated herein by reference. Typically, such groups are incorporated onto the diisocyanate or diisocyanate component of the polyurethane or polyurea ionomers. The anionic group can also be attached to the polyol or amine component of the polyurethane or polyurea, respectively. Preferably, the anionic group is based on a sulfonic, carboxylic or phosphoric acid group. Also, more than one type of anionic group can be incorporated into the polyurethane or polyurea. Examples of anionic polyurethane ionomers with anionic groups attached to the diisocyanate moiety can have a chemical structure according to the following formula:

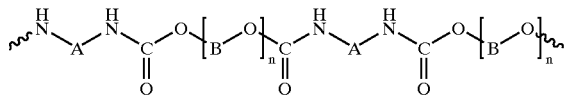

where A=R—$Z^-M^{+x}$; R is a straight chain or branched aliphatic group, a substituted straight chain or branched aliphatic group, or an aromatic or substituted aromatic group; Z=$SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; x=1 to 5; B is a straight chain or branched aliphatic group, a substituted straight chain or branched aliphatic group, or an aromatic or substituted aromatic group; and n=1 to 100. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hf^{+x}$.

Exemplary anionic polyurethane ionomers with anionic groups attached to the polyol component of the polyurethane are characterized by the above chemical structure where A is a straight chain or branched aliphatic group, a substituted straight chain or branched aliphatic group, or an aromatic or substituted aromatic group; B=R—$Z^-M^{+x}$; R is a straight chain or branched aliphatic group, a substituted straight chain or branched aliphatic group, or an aromatic or substituted aromatic group; Z=$SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; x=1 to 5; and n=1 to 100. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$ or $Hf^{+x}$.

Examples of suitable anionic polyurea ionomers with anionic groups attached to the diisocyanate component have a chemical structure according to the following chemical structure:

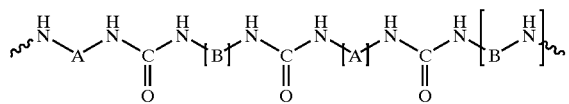

where A=R—$Z^-M^{+x}$; R is a straight chain or branched aliphatic group, a substituted straight chain or branched aliphatic group, or an aromatic or substituted aromatic group; Z=$SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; x=1 to 5; and B is a straight chain or branched aliphatic group, a substituted straight chain or branched aliphatic group, or an aromatic or substituted aromatic group. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$, or $Hf^{+x}$.

Suitable anionic polyurea ionomers with anionic groups attached to the amine component of the polyurea are characterized by the above chemical structure where A is a straight chain or branched aliphatic group, a substituted straight chain or branched aliphatic group, or an aromatic or substituted aromatic group; B=R—$Z^-M^{+x}$; R is a straight chain or branched aliphatic group, a substituted straight chain or branched aliphatic group, or an aromatic or substituted aromatic group; Z=$SO_3^-$, $CO_2^-$ or $HPO_3^-$; M is a group IA, IB, IIA, IIB, IIIA, IIIB, IVA, IVB, VA, VB, VIA, VIB, VIIB or VIIIB metal; and x=1 to 5. Preferably, $M^{+x}$ is one of the following: $Li^+$, $Na^+$, $K^+$, $Mg^{+2}$, $Zn^{+2}$, $Ca^{+2}$, $Mn^{+2}$, $Al^{+3}$, $Ti^{+x}$, $Zr^{+x}$, $W^{+x}$, or $Hf^{+x}$. The anionic polyurethane and polyurea ionomers may also be neutralized up to 100% by the organic fatty acids described above.

The anionic polymers useful in the present invention, such as those disclosed in U.S. Pat. No. 6,221,960 which is incorporated herein by reference, include any homopolymer, copolymer or terpolymer having neutralizable hydroxyl and/or dealkylable ether groups, and in which at least a portion of the neutralizable or dealkylable groups are neutralized or dealkylated with a metal ion.

As used herein "neutralizable" or "dealkylable" groups refer to a hydroxyl or ether group pendent from the polymer chain and capable of being neutralized or dealkylated by a metal ion, preferably a metal ion base. These neutralized polymers have improved properties critical to golf ball performance, such as resiliency, impact strength and toughness, and abrasion resistance. Suitable metal bases are ionic compounds comprising a metal cation and a basic anion. Examples of such bases include hydroxides, carbonates, acetates, oxides, sulfides, and the like.

The particular base to be used depends upon the nature of the hydroxyl or ether compound to be neutralized or dealkylated, and is readily determined by one skilled in the art. Preferred anionic bases include hydroxides, carbonates, oxides and acetates.

The metal ion can be any metal ion which forms an ionic compound with the anionic base. The metal is not particularly limited, and includes alkali metals, preferably lithium, sodium or potassium; alkaline earth metals, preferably magnesium or calcium; transition metals, preferably titanium, zirconium, or zinc; and Group III and IV metals. The metal ion can have a +1 to +5 charge. Most preferably, the metal is lithium, sodium, potassium, zinc, magnesium, titanium, tungsten, or calcium, and the base is hydroxide, carbonate or acetate.

The anionic polymers useful in the present invention include those which contain neutralizable hydroxyl and/or dealkylable ether groups. Exemplary polymers include ethylene vinyl alcohol copolymers, polyvinyl alcohol, polyvinyl acetate, poly(p-hydroxymethylene styrene), and p-methoxy styrene, to name but a few. It will be apparent to one skilled in the art that many such polymers exist and thus can be used in the compositions of the invention. In general, the anionic polymer can be described by the chemical structure:

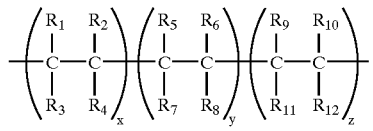

where $R_1$ is OH, $OC(O)R_a$, $O—M^{+V}$, $(CH_2)_n R_b$, $(CHR_2)_n R_b$, or aryl, wherein n is at least 1, $R_a$ is a lower alkyl, M is a metal ion, V is an integer from 1 to 5, $R_b$ is OH, $OC(O)R_a$, $O—M^{+V}$, and $R_z$ is a lower alkyl or aryl, and $R_2$, $R_3$ and $R_4$ are each independently hydrogen, straight-chain or branched-chain lower alkyl. $R_2$, $R_3$ and $R_4$ may also be similarly substituted. Preferably n is from 1 to 12, more preferably 1 to 4.

The term "substituted," as used herein, means one or more hydrogen atoms has been replaced by a functional group. Functional groups include, but are not limited to, hydroxyl, amino, carboxyl, sulfonic, amide, ether, ether, phosphates, thiol, nitro, silane, and halogen, as well as many others which are quite familiar to those of ordinary skill in this art.

The terms "alkyl" or "lower alkyl," as used herein, includes a group of from about 1 to 30 carbon atoms, preferably 1 to 10 carbon atoms.

In the anionic polymers useful in the present invention, at least a portion of the neutralizable or dealkylable groups of $R_1$ are neutralized or dealkylated by an organic fatty acid, a salt thereof, a metal base, or a mixture thereof to form the corresponding anionic moiety. The portion of the neutralizable or dealkylable groups which are neutralized or dealkylated can be between about 1 to about 100 weight percent, preferably between about 50 to about 100 weight percent, more preferably before about 90 to about 100.

Neutralization or dealkylation may be performed by melting the polymer first, then adding a metal ion in an extruder. The degree of neutralization or dealkylation is controlled by varying the amount of metal ion added. Any method of neutralization or dealkylation available to those of ordinary skill in the art may also be suitably employed.

In one embodiment, the anionic polymer is repeating units any one of the three homopolymer units in the chemical structure above. In a preferred embodiment, $R_2$, $R_3$ and $R_4$ are hydrogen, and $R_1$ is hydroxyl, i.e., the anionic polymer is a polyvinyl alcohol homopolymer in which a portion of the hydroxyl groups have been neutralized with a metal base. In another preferred embodiment, $R_2$, $R_3$ and $R_4$ are hydrogen, $R_1$ is $OC(O)R_a$, and $R_a$ is methyl, i.e., the anionic polymer is a polyvinyl acetate homopolymer in which a portion of the methyl ether groups have been dealkylated with a metal ion.

The anionic polymer can also be a copolymer of two different repeating units having different substituents, or a terpolymer of three different repeating units described in the above formula. In this embodiment, the polymer can be a random copolymer, an alternating copolymer, or a block copolymer, where the term "copolymer" includes terpolymers.

In another embodiment, the anionic polymer is a copolymer, wherein $R_5$, $R_6$, $R_7$ and $R_8$ are each independently selected from the group defined above for $R_2$. The first unit of the copolymer can comprise from about 1 to 99 percent weight percent of the polymer, preferably from about 5 to 50 weight percent, and the second unit of the copolymer can comprise from about 99 to 1 weight percent, preferably from about 95 to 50 weight percent. In one preferred embodiment, the anionic polymer is a random, alternating or block copolymer of units (Ia) and (Ib) wherein $R_1$ is hydroxyl, and each of the remaining R groups is hydrogen, i.e., the polymer is a copolymer of ethylene and vinyl alcohol. In another preferred embodiment, the anionic polymer is a random, alternating or block copolymer of units (Ia) and (Ib) wherein $R_1$ is $OC(O)R_5$, where $R_5$ is methyl, and each of the remaining R groups is hydrogen, i.e., the polymer is a copolymer of ethylene and vinyl acetate.

In another embodiment, the anionic polymer is an anionic polymer having neutralizable hydroxyl and/or dealkylable ether groups of as in the above chemical structure wherein $R_{1-9}$ and $R_b$ and $R_z$ are as defined above; $R_{10-11}$ are each independently selected from the group as defined above for $R_2$; and $R_{12}$ is OH or $OC(O)R_{13}$, where $R_{13}$ is a lower alkyl; wherein x, y and z indicate relative weight percent of the different units. X can be from about 99 to about 50 weight percent of the polymer, y can be from about 1 to about 50 weight percent of the polymer, and z ranges from about 0 to about 50 weight percent of the polymer. At least a portion of the neutralizable groups $R_1$ are neutralized. When the amount of z is greater than zero, a portion of the groups $R_{10}$ can also be fully or partially neutralized, as desired.

In particular, the anionic polymers and blends thereof can comprise compatible blends of anionic polymers and ionomers, such as the ionomers described above, and ethylene acrylic methacrylic acid ionomers, and their terpolymers, sold commercially under the trade names SURLYN® and IOTEK® by DuPont and Exxon respectively. The anionic polymer blends useful in the golf balls of the invention can also include other polymers, such as polyvinylalcohol, copolymers of ethylene and vinyl alcohol, poly(ethylethylene), poly(heptylethylene), poly(hexyldecylethylene), poly(isopentylethylene), poly(butyl acrylate), acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(4-[(2-butoxyethoxy)methyl]styrene), poly[oxy(ethoxymethyl)ethylene], poly(oxyethylethylene), poly(oxytetramethylene), poly(oxytrimethylene), poly(silanes) and poly(silazanes), polyamides, polycarbonates, polyesters, styrene block copolymers, polyetheramides, polyurethanes, main-chain heterocyclic polymers and poly(furan tetracarboxylic acid diimides), as well as the classes of polymers to which they belong.

The anionic polymer compositions of the present invention typically have a flexural modulus of from about 500 psi to about 300,000 psi, preferably from about 2000 to about 200,000 psi. The anionic polymer compositions typically have a material hardness of at least about 15 Shore A, preferably between about 30 Shore A and 80 Shore D, more preferably between about 50 Shore A and 60 Shore D. The loss tangent, or dissipation factor, is a ratio of the loss modulus over the dynamic shear storage modulus, and is typically less than about 1, preferably less than about 0.01, and more preferably less than about 0.001 for the anionic polymer compositions measured at about 23° C. The specific gravity is typically greater than about 0.7, preferably greater than about 1, for the anionic polymer compositions. The dynamic shear storage modulus, or storage modulus, of the anionic polymer compositions at about 23° C. is typically at least about 10,000 dyn/cm$^2$.

The golf balls of the present invention may comprise a variety of constructions. Referring to FIG. 1, in one embodiment of the present invention, golf ball 10 includes a core 12, an inner cover layer 14 surrounding the core 12, and an outer cover layer 16. Preferably, the core 12 is solid.

In a preferred embodiment, the solid core 12 comprises the HNP's of the present invention. In an alternative embodiment, the solid core 12 may include compositions having a base rubber, a crosslinking agent, a filler, and a co-crosslinking or initiator agent, and the inner cover layer 14 comprises the HNP's of the present invention.

The base rubber typically includes natural or synthetic rubbers. A preferred base rubber is 1,4-polybutadiene having a cis-structure of at least 40%. More preferably, the base rubber comprises high-Mooney-viscosity rubber. If desired, the polybutadiene can also be mixed with other elastomers known in the art such as natural rubber, polyisoprene rubber and/or styrene-butadiene rubber in order to modify the properties of the core.

The crosslinking agent includes a metal salt of an unsaturated fatty acid such as a zinc salt or a magnesium salt of an unsaturated fatty acid having 3 to 8 carbon atoms such as acrylic or methacrylic acid. Suitable cross linking agents include metal salt diacrylates, dimethacrylates and monomethacrylates wherein the metal is magnesium, calcium, zinc, aluminum, sodium, lithium or nickel. The crosslinking agent is present in an amount from about 15 to about 30 parts per hundred of the rubber, preferably in an amount from about 19 to about 25 parts per hundred of the rubber and most preferably having about 20 to 24 parts crosslinking agent per hundred of rubber. The core compositions of the present invention may also include at least one organic or inorganic cis-trans catalyst to convert a portion of the cis-isomer of polybutadiene to the trans-isomer, as desired.

The initiator agent can be any known polymerization initiator which decomposes during the cure cycle. Suitable initiators include peroxide compounds such as dicumyl peroxide, 1,1-di-(t-butylperoxy) 3,3,5-trimethyl cyclohexane, a-a bis-(t-butylperoxy) diisopropylbenzene, 2,5-dimethyl-2,5di-(t-butylperoxy) hexane or di-t-butyl peroxide and mixtures thereof.

Fillers, any compound or composition that can be used to vary the density and other properties of the core, typically include materials such as tungsten, zinc oxide, barium sulfate, silica, calcium carbonate, zinc carbonate, metals, metal oxides and salts, regrind (recycled core material typically ground to about 30 mesh particle), high-Mooney-viscosity rubber regrind, and the like.

Figure 2:
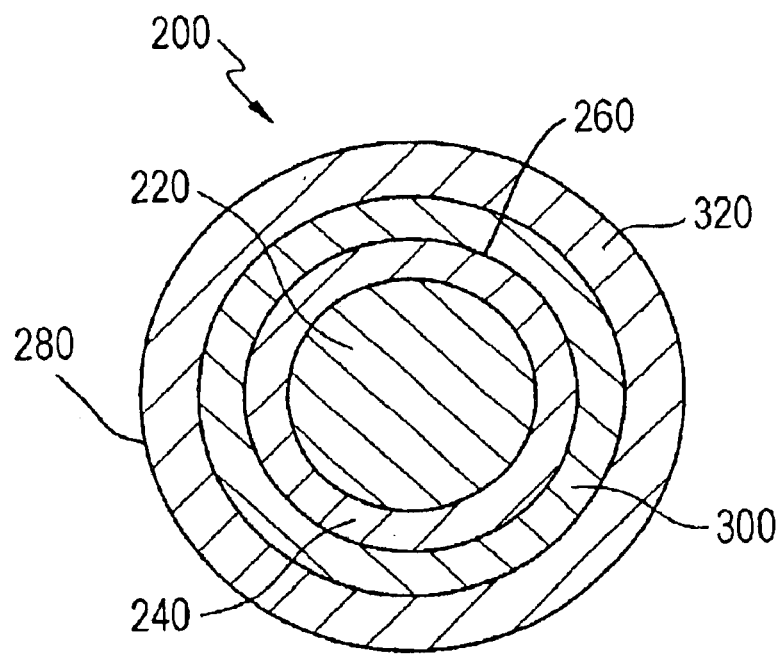
FIG. 2 is a second embodiment of a golf ball of the present invention.

The golf ball cores of the present invention may also comprise a variety of constructions. For example, the core may comprise a single layer or a plurality of layers. The core may also comprise a formed of a tensioned elastomeric material. Referring to FIG. 2, in another embodiment of the present invention, golf ball 20 comprises a solid center 22 surrounded by at least one additional solid outer core layer 24. The "dual" core 26 is surrounded by a "double" cover 28 comprising an inner cover layer 30 and an outer cover layer 32.

Preferably, the solid center 22 comprises the HNP's of the present invention. In another embodiment, the inner cover layer 28 comprises the highly-neutralized acid copolymers of the present invention. In an alternative embodiment, the outer core layer 24 comprises the highly-neutralized acid copolymers of the present invention.

At least one of the outer core layers is formed of a resilient rubber-based component comprising a high-Mooney-viscosity rubber, and a crosslinking agent present in an amount from about 20 to about 40 parts per hundred, from about 30 to about 38 parts per hundred, and most preferably about 37 parts per hundred. It should be understood that the term "parts per hundred" is with reference to the rubber by weight.

When the golf ball of the present invention includes an intermediate layer, such as an outer core layer or an inner cover layer, any or all of these layer(s) may comprise thermoplastic and thermosetting material, but preferably the intermediate layer(s), if present, comprise any suitable material, such as ionic copolymers of ethylene and an unsaturated monocarboxylic acid which are available under the trademark SURLYN® of E. I. DuPont de Nemours & Co., of Wilmington, Del., or IOTEK® or ESCOR® of Exxon. These are copolymers or terpolymers of ethylene and methacrylic acid or acrylic acid partially neutralized with salts of zinc, sodium, lithium, magnesium, potassium, calcium, manganese, nickel or the like, in which the salts are the reaction product of an olefin having from 2 to 8 carbon atoms and an unsaturated monocarboxylic acid having 3 to 8 carbon atoms. The carboxylic acid groups of the copolymer may be totally or partially neutralized and might include methacrylic, crotonic, maleic, fumaric or itaconic acid.

This golf ball can likewise include one or more homopolymeric or copolymeric inner cover materials, such as:

(1) Vinyl resins, such as those formed by the polymerization of vinyl chloride, or by the copolymerization of vinyl chloride with vinyl acetate, acrylic esters or vinylidene chloride;

(2) Polyolefins, such as polyethylene, polypropylene, polybutylene and copolymers such as ethylene methylacrylate, ethylene ethylacrylate, ethylene vinyl acetate, ethylene methacrylic or ethylene acrylic acid or propylene acrylic acid and copolymers and homopolymers produced using a single-site catalyst or a metallocene catalyst;

(3) Polyurethanes, such as those prepared from polyols and diisocyanates or polyisocyanates, in particular PPDI-based thermoplastic polyurethanes, and those disclosed in U.S. Pat. No. 5,334,673;

(4) Polyureas, such as those disclosed in U.S. Pat. No. 5,484,870;

(5) Polyamides, such as poly(hexamethylene adipamide) and others prepared from diamines and dibasic acids, as well as those from amino acids such as poly (caprolactam), and blends of polyamides with SURLYN®, polyethylene, ethylene copolymers, ethylene-propylene-non-conjugated diene terpolymer, and the like;

(6) Acrylic resins and blends of these resins with poly vinyl chloride, elastomers, and the like;

(7) Thermoplastics, such as urethane; olefinic thermoplastic rubbers, such as blends of polyolefins with ethylene-propylene-non-conjugated diene terpolymer; block copolymers of styrene and butadiene, isoprene or ethylene-butylene rubber; or copoly(ether-amide), such as PEBAX®, sold by ELF Atochem of Philadelphia, Pa.;

(8) Polyphenylene oxide resins or blends of polyphenylene oxide with high impact polystyrene as sold under the trademark NORYL® by General Electric Company of Pittsfield, Mass.;

(9) Thermoplastic polyesters, such as polyethylene terephthalate, polybutylene terephthalate, polyethylene terephthalate/glycol modified, poly(trimethylene terepthalate), and elastomers sold under the trademarks HYTREL® by E. I. DuPont de Nemours & Co. of Wilmington, Del., and LOMOD® by General Electric Company of Pittsfield, Mass.;

(10) Blends and alloys, including polycarbonate with acrylonitrile butadiene styrene, polybutylene terephthalate, polyethylene terephthalate, styrene maleic anhydride, polyethylene, elastomers, and the like, and polyvinyl chloride with acrylonitrile butadiene styrene or ethylene vinyl acetate or other elastomers; and

(11) Blends of thermoplastic rubbers with polyethylene, propylene, polyacetal, nylon, polyesters, cellulose esters, and the like.

Preferably, the inner cover includes polymers, such as ethylene, propylene, butene-1 or hexane-1 based homopolymers or copolymers including functional monomers, such as acrylic and methacrylic acid and fully or partially neutralized ionomer resins and their blends, methyl acrylate, methyl methacrylate homopolymers and copolymers, imidized, amino group containing polymers, polycarbonate, reinforced polyamides, polyphenylene oxide, high impact polystyrene, polyether ketone, polysulfone, poly(phenylene sulfide), acrylonitrile-butadiene, acrylic-styrene-acrylonitrile, poly(ethylene terephthalate), poly(butylene terephthalate), poly(vinyl alcohol), poly(tetrafluoroethylene) and their copolymers including functional comonomers, and blends thereof. Suitable cover compositions also include a polyether or polyester thermoplastic urethane, a thermoset polyurethane, a low modulus ionomer, such as acid-containing ethylene copolymer ionomers, including E/X/Y terpolymers where E is ethylene, X is an acrylate or methacrylate-based softening comonomer present in about 0 to 50 weight percent and Y is acrylic or methacrylic acid present in about 5 to 35 weight percent. More preferably, in a low spin rate embodiment designed for maximum distance, the acrylic or methacrylic acid is present in about 16 to 35 weight percent, making the ionomer a high modulus ionomer. In a higher spin embodiment, the inner cover layer includes an ionomer where an acid is present in about 10 to 15 weight percent and includes a softening comonomer. Additionally, high-density polyethylene ("HDPE"), low-density polyethylene ("LDPE"), LLDPE, and homo- and co-polymers of polyolefin are suitable for a variety of golf ball layers.

In one embodiment, the outer cover preferably includes a polyurethane composition comprising the reaction product of at least one polyisocyanate, polyol, and at least one curing agent. Any polyisocyanate available to one of ordinary skill in the art is suitable for use according to the invention. Exemplary polyisocyanates include, but are not limited to, 4,4'-diphenylmethane diisocyanate ("MDI"); polymeric MDI; carbodiimide-modified liquid MDI; 4,4'-dicyclohexylmethane diisocyanate ("$H_{12}$MDI"); p-phenylene diisocyanate ("PPDI"); m-phenylene diisocyanate ("MPDI"); toluene diisocyanate ("TDI"); 3,3'-dimethyl-4,4'-biphenylene diisocyanate ("TODI"); isophoronediisocyanate ("IPDI"); hexamethylene diisocyanate ("HDI"); naphthalene diisocyanate ("NDI"); xylene diisocyanate ("XDI"); p-tetramethylxylene diisocyanate ("p-TMXDI"); m-tetramethylxylene diisocyanate ("m-TMXDI"); ethylene diisocyanate; propylene-1,2-diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"); tetracene diisocyanate; napthalene diisocyanate; anthracene diisocyanate; isocyanurate of toluene diisocyanate; uretdione of hexamethylene diisocyanate; and mixtures thereof. Polyisocyanates are known to those of ordinary skill in the art as having more than one isocyanate group, e.g., di-isocyanate, tri-isocyanate, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups, typically less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, and more preferably, less than about 7.0%.

Any polyol available to one of ordinary skill in the art is suitable for use according to the invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate and poly(hexamethylene carbonate) glycol. The hydrocarbon chain can have saturated or unsaturated bonds, or substituted or unsubstituted aromatic and cyclic groups. In one embodiment, the molecular weight of the polyol is from about 200 to about 4000.

Polyamine curatives are also suitable for use in the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline) ("MCDEA"); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); 4,4'-diamino-3,3'-diethyl-5,5'-dimethyl diphenylmethane; 2,2',3,3'-tetrachloro diamino diphenylmethane; trimethylene glycol di-p-aminobenzoate; and mixtures thereof. Preferably, the curing agent of the present invention includes 3,5-dimethylthio-2,4-toluenediamine and isomers thereof, such as ETHACURE 300, commercially available from Albermarle Corporation of Baton Rouge, La. Suitable polyamine curatives, which include both primary and secondary amines, preferably have molecular weights ranging from about 64 to about 2000.

At least one of a diol, triol, tetraol, or hydroxy-terminated curatives may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy) benzene; 1,3-bis-[2-(2-hydroxyethoxy) ethoxy]benzene; 1,3-bis-{2-[2-(2-hydroxyethoxy)ethoxy] ethoxy}benzene; 1,4-butanediol; 1,5-pentanediol; 1,6-hexanediol; resorcinol-di-(β-hydroxyethyl) ether; hydroquinone-di-(β-hydroxyethyl) ether; and mixtures thereof. Preferred hydroxy-terminated curatives include 1,3-bis-(2-hydroxyethoxy) benzene; 1,3-bis-[2-(2-hydroxyethoxy) ethoxy]benzene; 1,3-bis-{2-[2-(2-hydroxyethoxy) ethoxy]ethoxy}benzene; 1,4-butanediol; and mixtures thereof. Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

In a preferred embodiment of the present invention, saturated polyurethanes used to form cover layers, preferably the outer cover layer, and may be selected from among both castable thermoset and thermoplastic polyurethanes.

In this embodiment, the saturated polyurethanes of the present invention are substantially free of aromatic groups or moieties. Saturated polyurethanes suitable for use in the invention are a product of a reaction between at least one polyurethane prepolymer and at least one saturated curing agent. The polyurethane prepolymer is a product formed by a reaction between at least one saturated polyol and at least one saturated diisocyanate. As is well known in the art, a catalyst may be employed to promote the reaction between the curing agent and the isocyanate and polyol.

Saturated diisocyanates which can be used include, without limitation, ethylene diisocyanate; propylene-1,2-diisocyanate; tetramethylene-1,4-diisocyanate; 1,6-hexamethylene-diisocyanate ("HDI"); 2,2,4-trimethylhexamethylene diisocyanate; 2,4,4-trimethylhexamethylene diisocyanate; dodecane-1,12-diisocyanate; dicyclohexylmethane diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; isophorone diisocyanate ("IPDI"); methyl cyclohexylene diisocyanate ; triisocyanate of HDI; triisocyanate of 2,2,4-trimethyl-1,6-hexane diisocyanate ("TMDI"). The most preferred saturated diisocyanates are 4,4'-dicyclohexylmethane diisocyanate ("HMDI") and isophorone diisocyanate ("IPDI").

Saturated polyols which are appropriate for use in this invention include without limitation polyether polyols such as polytetramethylene ether glycol and poly(oxypropylene) glycol. Suitable saturated polyester polyols include polyethylene adipate glycol, polyethylene propylene adipate glycol, polybutylene adipate glycol, polycarbonate polyol and ethylene oxide-capped polyoxypropylene diols. Saturated polycaprolactone polyols which are useful in the invention include diethylene glycol-initiated polycaprolactone, 1,4-butanediol-initiated polycaprolactone, 1,6-hexanediol-initiated polycaprolactone; trimethylol propane-initiated polycaprolactone, neopentyl glycol initiated polycaprolactone, and polytetramethylene ether glycol-initiated polycaprolactone. The most preferred saturated polyols are polytetramethylene ether glycol and PTMEG-initiated polycaprolactone.

Suitable saturated curatives include 1,4-butanediol, ethylene glycol, diethylene glycol, polytetramethylene ether glycol, propylene glycol; trimethanolpropane; tetra-(2-hydroxypropyl)-ethylenediamine; isomers and mixtures of isomers of cyclohexyldimethylol, isomers and mixtures of isomers of cyclohexane bis(methylamine); triisopropanolamine; ethylene diamine; diethylene triamine; triethylene tetramine; tetraethylene pentamine; 4,4'-dicyclohexylmethane diamine; 2,2,4-trimethyl-1,6-hexanediamine; 2,4,4-trimethyl-1,6-hexanediamine; diethyleneglycol di-(aminopropyl)ether; 4,4'-bis-(sec-butylamino)-dicyclohexylmethane; 1,2-bis-(sec-butylamino)cyclohexane; 1,4-bis-(sec-butylamino)

cyclohexane; isophorone diamine; hexamethylene diamine; propylene diamine; 1-methyl-2,4-cyclohexyl diamine; 1-methyl-2,6-cyclohexyl diamine; 1,3-diaminopropane; dimethylamino propylamine; diethylamino propylamine; imido-bis-propylamine; isomers and mixtures of isomers of diaminocyclohexane; monoethanolamine; diethanolamine; triethanolamine; monoisopropanolamine; and diisopropanolamine. The most preferred saturated curatives are 1,4-butanediol, 1,4-cyclohexyldimethylol and 4,4'-bis-(sec-butylamino)-dicyclohexylmethane.

Suitable catalysts include, but are not limited to bismuth catalyst, oleic acid, triethylenediamine (DABCO®-33LV), di-butyltin dilaurate (DABCO®-T12) and acetic acid. The most preferred catalyst is di-butyltin dilaurate (DABCO®-T12). DABCO® materials are manufactured by Air Products and Chemicals, Inc.

Thermoplastic materials may be blended with other thermoplastic materials, but thermosetting materials are difficult if not impossible to blend homogeneously after the thermosetting materials are formed. Preferably, the saturated polyurethane comprises from about 1% to about 100%, more preferably from about 10% to about 75% of the cover composition and/or the intermediate layer composition. About 90% to about 10%, more preferably from about 90% to about 25% of the cover and/or the intermediate layer composition is comprised of one or more other polymers and/or other materials as described below. Such polymers include, but are not limited to polyurethane/polyurea ionomers, polyurethanes or polyureas, epoxy resins, polyethylenes, polyamides and polyesters, polycarbonates and polyacrylin. Unless otherwise stated herein, all percentages are given in percent by weight of the total composition of the golf ball layer in question.

Polyurethane prepolymers are produced by combining at least one polyol, such as a polyether, polycaprolactone, polycarbonate or a polyester, and at least one isocyanate. Thermosetting polyurethanes are obtained by curing at least one polyurethane prepolymer with a curing agent selected from a polyamine, triol or tetraol. Thermoplastic polyurethanes are obtained by curing at least one polyurethane prepolymer with a diol curing agent. The choice of the curatives is critical because some urethane elastomers that are cured with a diol and/or blends of diols do not produce urethane elastomers with the impact resistance required in a golf ball cover. Blending the polyamine curatives with diol cured urethane elastomeric formulations leads to the production of thermoset urethanes with improved impact and cut resistance.

Thermoplastic polyurethanes may be blended with suitable materials to produce a thermoplastic end product. Examples of such additional materials may include ionomers such as the SURLYN®, ESCOR® and IOTEK® copolymers described above.

Other suitable materials which may be combined with the saturated polyurethanes in forming the cover and/or intermediate layer(s) of the golf balls of the invention include ionic or non-ionic polyurethanes and polyureas, epoxy resins, polyethylenes, polyamides and polyesters. For example, the cover and/or intermediate layer may be formed from a blend of at least one saturated polyurethane and thermoplastic or thermoset ionic and non-ionic urethanes and polyurethanes, cationic urethane ionomers and urethane epoxies, ionic and non-ionic polyureas and blends thereof. Examples of suitable urethane ionomers are disclosed in U.S. Pat. No. 5,692,974 entitled "Golf Ball Covers", the disclosure of which is hereby incorporated by reference in its entirety. Other examples of suitable polyurethanes are described in U.S. Pat. No. 5,334,673. Examples of appropriate polyureas are discussed in U.S. Pat. No. 5,484,870 and examples of suitable polyurethanes cured with epoxy group containing curing agents are disclosed in U.S. Pat. No. 5,908,358, the disclosures of which are hereby incorporated herein by reference in their entirety.

A variety of conventional components can be added to the cover compositions of the present invention. These include, but are not limited to, white pigment such as $TiO_2$, ZnO, optical brighteners, surfactants, processing aids, foaming agents, density-controlling fillers, UV stabilizers and light stabilizers. Saturated polyurethanes are resistant to discoloration. However, they are not immune to deterioration in their mechanical properties upon weathering. Addition of UV absorbers and light stabilizers therefore helps to maintain the tensile strength and elongation of the saturated polyurethane elastomers. Suitable UV absorbers and light stabilizers include TINUVIN® 328, TINUVIN® 213, TINUVIN® 765, TINUVIN® 770 and TINUVIN® 622. The preferred UV absorber is TINUVIN® 328, and the preferred light stabilizer is TINUVIN® 765. TINUVIN® products are available from Ciba-Geigy. Dyes, as well as optical brighteners and fluorescent pigments may also be included in the golf ball covers produced with polymers formed according to the present invention. Such additional ingredients may be added in any amounts that will achieve their desired purpose.

Any method known to one of ordinary skill in the art may be used to polyurethanes of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition. Other methods suitable for forming the layers of the present invention include reaction injection molding ("RIM"), liquid injection molding ("LIM"), and pre-reacting the components to form an injection moldable thermoplastic polyurethane and then injection molding, all of which are known to one of ordinary skill in the art.

Additional components which can be added to the polyurethane composition include UV stabilizers and other dyes, as well as optical brighteners and fluorescent pigments and dyes. Such additional ingredients may be added in any amounts that will achieve their desired purpose. It has been found by the present invention that the use of a castable, reactive material, which is applied in a fluid form, makes it possible to obtain very thin outer cover layers on golf balls. Specifically, it has been found that castable, reactive liquids, which react to form a urethane elastomer material, provide desirable very thin outer cover layers.

The castable, reactive liquid employed to form the urethane elastomer material can be applied over the core using a variety of application techniques such as spraying, dipping, spin coating, or flow coating methods which are well known in the art. An example of a suitable coating technique is that which is disclosed in U.S. Pat. No. 5,733,428, the disclosure of which is hereby incorporated by reference in its entirety.

The outer cover is preferably formed around the inner cover by mixing and introducing the material in the mold halves. It is important that the viscosity be measured over time, so that the subsequent steps of filling each mold half, introducing the core into one half and closing the mold can be properly timed for accomplishing centering of the core cover halves fusion and achieving overall uniformity. Suitable viscosity range of the curing urethane mix for introducing cores into the mold halves is determined to be approximately between about 2,000 cP and about 30,000 cP, with the preferred range of about 8,000 cP to about 15,000 cP.

To start the cover formation, mixing of the prepolymer and curative is accomplished in motorized mixer including mixing head by feeding through lines metered amounts of curative and prepolymer. Top preheated mold halves are filled and placed in fixture units using centering pins moving into holes in each mold. At a later time, a bottom mold half or a series of bottom mold halves have similar mixture amounts introduced into the cavity. After the reacting materials have resided in top mold halves for about 40 to about 80 seconds, a core is lowered at a controlled speed into the gelling reacting mixture.

A ball cup holds the ball core through reduced pressure (or partial vacuum). Upon location of the coated core in the halves of the mold after gelling for about 40 to about 80 seconds, the vacuum is released allowing core to be released. The mold halves, with core and solidified cover half thereon, are removed from the centering fixture unit, inverted and mated with other mold halves which, at an appropriate time earlier, have had a selected quantity of reacting polyurethane prepolymer and curing agent introduced therein to commence gelling.

Similarly, U.S. Pat. No. 5,006,297 to Brown et al. and U.S. Pat. No. 5,334,673 to Wu both also disclose suitable molding techniques which may be utilized to apply the castable reactive liquids employed in the present invention. Further, U.S. Pat. Nos. 6,180,040 and 6,180,722 disclose methods of preparing dual core golf balls. The disclosures of these patents are hereby incorporated by reference in their entirety. However, the method of the invention is not limited to the use of these techniques.

Depending on the desired properties, balls prepared according to the invention can exhibit substantially the same or higher resilience, or coefficient of restitution ("COR"), with a decrease in compression or modulus, compared to balls of conventional construction. Additionally, balls prepared according to the invention can also exhibit substantially higher resilience, or COR, without an increase in compression, compared to balls of conventional construction. Another measure of this resilience is the "loss tangent," or tan δ, which is obtained when measuring the dynamic stiffness of an object. Loss tangent and terminology relating to such dynamic properties is typically described according to ASTM D4092-90. Thus, a lower loss tangent indicates a higher resiliency, thereby indicating a higher rebound capacity. Low loss tangent indicates that most of the energy imparted to a golf ball from the club is converted to dynamic energy, i.e., launch velocity and resulting longer distance. The rigidity or compressive stiffness of a golf ball may be measured, for example, by the dynamic stiffness. A higher dynamic stiffness indicates a higher compressive stiffness. To produce golf balls having a desirable compressive stiffness, the dynamic stiffness of the crosslinked reaction product material should be less than about 50,000 N/m at −50° C. Preferably, the dynamic stiffness should be between about 10,000 and 40,000 N/m at −50° C., more preferably, the dynamic stiffness should be between about 20,000 and 30,000 N/m at −50° C.

The molding process and composition of golf ball portions typically results in a gradient of material properties. Methods employed in the prior art generally exploit hardness to quantify these gradients. Hardness is a qualitative measure of static modulus and does not represent the modulus of the material at the deformation rates associated with golf ball use, i.e., impact by a club. As is well known to one skilled in the art of polymer science, the time-temperature superposition principle may be used to emulate alternative deformation rates. For golf ball portions including polybutadiene, a 1-Hz oscillation at temperatures between 0° C. and −50° C. are believed to be qualitatively equivalent to golf ball impact rates. Therefore, measurement of loss tangent and dynamic stiffness at 0° C. to −50° C. may be used to accurately anticipate golf ball performance, preferably at temperatures between about −20° C. and −50° C.

Figure 3:
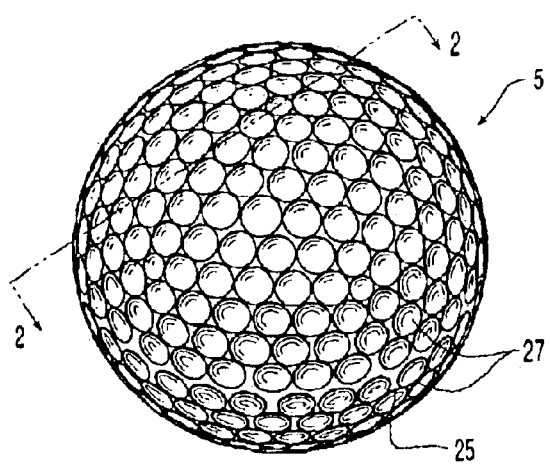
FIG. 3 is a side view of a golf ball according to the present invention.

Referring to FIG. 3, in another embodiment of the present invention, a golf ball 5 of the present invention is substantially spherical and has a cover 25 with a plurality of dimples 27 formed on the outer surface thereof.

Figure 4:
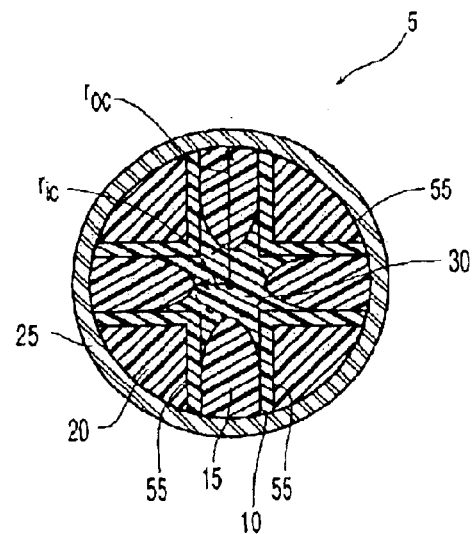
FIG. 4 is a cross-sectional view along the line 2—2 of FIG. 3 of the golf ball according to the present invention.
Figure 5:
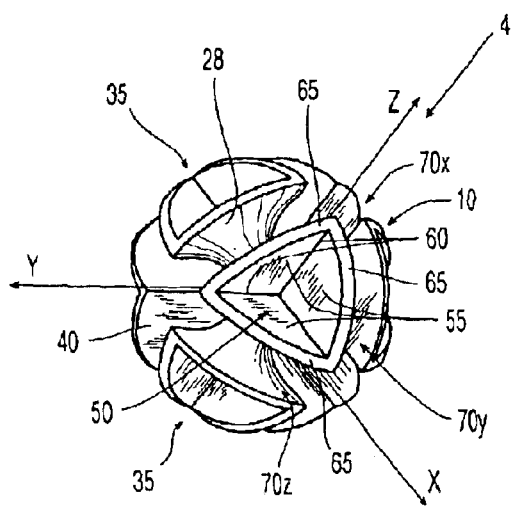
FIG. 5 is a side view of an inner core of the golf ball shown in FIG. 4.
Figure 6:
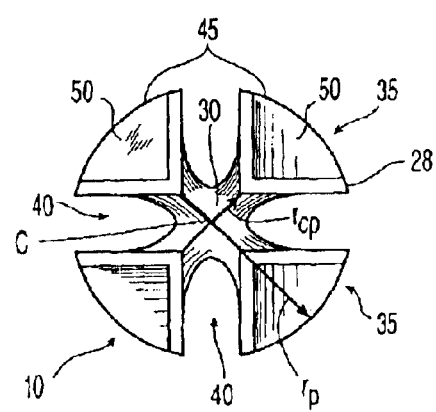
FIG. 6 is a plan view along the arrow 4 of FIG. 5 of the inner core according to the present invention.

Referring to FIGS. 4–6, the golf ball 5 includes an inner core 10, an outer core 15 and 20, and the cover 25 (shown without dimples). The inner core 10 includes a three-dimensional outer surface 28, a center C, a central portion 30, and a plurality of projections 35. The central portion 30 and projections 35 are integrally formed, so that the inner core is a single piece.

Referring to FIG. 6, the outer surface 28 of the inner core is defined by radial distances from the center C. At least two of the radial distances about the outer surface are different. The central portion 30 has a radius, designated by the arrow $r_{cp}$, that extends from the core center C to the outer surface of the central portion. The central portion 30 is solid in this embodiment.

Referring to FIGS. 5 and 6, each of the projections 35 extend radially outwardly from the central portion 30, and are spaced from one another to define gaps 40 there between. The projections 35 are shaped so that the inner core 10 is substantially spherically symmetrical.

Each projection 35 has an enlarged free end 45 and a substantially conical shape. Each free end 45 includes an open recess 50. Each projection has a radius, designated by the arrow $r_p$, that extends from the core center C to the outer surface 28 at the free end 45. The projection radii $r_p$ differ from the central portion radius $r_{cp}$.

Referring to FIG. 5, each recess 50 is formed by three integral side walls 55. Each of the side walls 55 is shaped like a flat quarter circle. The quarter circle includes two straight edges 60 joined by a curved edge 65. In each projection 35, each of the side walls 55 is joined at the straight edges 60. The curved edges 65 of each of the projections allow the inner core to have a spherical shape.

With reference to a three-dimensional Cartesian Coordinate system, there are perpendicular x, y, and z axes, respectively that form eight octants. There are eight projections 35 with one in each octant of the coordinate system, so that each of the projections 35 forms an octant of the skeletal sphere. Thus, the inner core is symmetrical. The gaps 40 define three perpendicular concentric rings $70_x$, $70_y$, and $70_z$. The subscript for the reference number 70 designates the central axis of the ring about which the ring circumscribes.

Turning to FIGS. 4 and 6, the outer core includes a first section 15 and a second section 20. The first section 15 fills the gaps 40 around the projections 35, and is disposed between the side walls 55 of adjacent projections 35. It is preferred that the diameter of the core which includes the inner core and the outer core is between about 1.00 inches and about 1.64 inches for a ball having a diameter of 1.68 inches.

The second section 20 fills the recesses 50 of each projection 35, and is disposed between the side walls 55 of a single projection 35. The outer core is formed so that the outer core terminates flush with the free end 45 of each projection 35. The outer core has a substantially spherical outer surface. The cover 25 is formed about the inner core 10 and the outer core sections 15 and 20, so that both the inner and outer cores abut the cover.

Referring to FIG. 4, the formation of a golf ball starts with forming the inner core 10. The inner core 10, outer core sections 15 and 20, and the cover 25 are formed by compression molding, by injection molding, or by casting. These methods of forming cores and covers of this type are well known in the art.

The materials used for the inner and outer core, as well as the cover, are selected so that the desired playing characteristics of the ball are achieved. The inner and outer core materials have substantially different material properties so that there is a predetermined relationship between the inner and outer core materials, to achieve the desired playing characteristics of the ball.

In one embodiment, the inner core is formed of a first material having a first Shore D hardness, a first elastic modulus, a first specific gravity, and a first Bashore resilience. The outer core is formed of a second material having a second Shore D hardness, a second elastic modulus, a second specific gravity, and a second Bashore resilience. Preferably, the material property of the first material equals at least one selected from the group consisting of the first Shore D hardness differing from the second Shore D hardness by at least 10 points, the first elastic modulus differing from the second elastic modulus by at least 10%, the first specific gravity differing from the second specific gravity by at least 0.1, or a first Bashore resilience differing from the second Bashore resilience by at least 10%. It is more preferred that the first material have all of these material property relationships.

Moreover, it is preferred that the first material has the first Shore D hardness between about 30 and about 80, the first elastic modulus between about 5,000 psi and about 100,000 psi, the first specific gravity between about 0.8 and about 1.6, and the first Bashore resilience greater than 30%.

In another embodiment, the first Shore D hardness is less than the second Shore D hardness, the first elastic modulus is less than the second elastic modulus, the first specific gravity is less than the second specific gravity, and the first Bashore resilience is less than the second Bashore resilience. In another embodiment, the first material properties are greater than the second material properties. The relationship between the first and second material properties depends on the desired playability characteristics.

Suitable inner and outer core materials include HNP's neutralized with organic fatty acids and salts thereof, metal cations, or a combination of both, thermosets, such as rubber, polybutadiene, polyisoprene; thermoplastics, such as ionomer resins, polyamides or polyesters; or thermoplastic elastomers. Suitable thermoplastic elastomers include PEBAX®, HYTREL®, thermoplastic urethane, and KRATON®, which are commercially available from Elf-Atochem, DuPont, B F Goodrich, and Shell, respectively. The inner and outer core materials can also be formed from a castable material. Suitable castable materials include, but are not limited to, urethane, urea, epoxy, diols, or curatives.

The cover 25 is selected from conventional materials used as golf ball covers based on the desired performance characteristics. The cover may be comprised of one or more layers. Cover materials such as ionomer resins, blends of ionomer resins, thermoplastic or thermoset urethanes, and balata, can be used as known in the art and discussed above.

Figure 7:
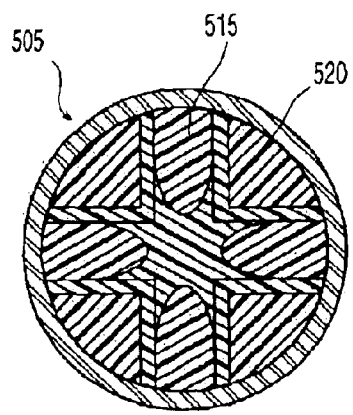
FIGS. 7–12 are cross-sectional views of other embodiments of golf balls according to the present invention.

Referring to FIG. 7, another embodiment of the golf ball 505 is shown. Similar structures to those discussed above use the same reference number preceded with the numeral "5." The golf ball 505 includes an outer core with a first section 515 and a second section 520. The first section 515 and the second section 520 are formed of two materials with different material properties. In this embodiment, the core includes three different materials.

Figure 8:
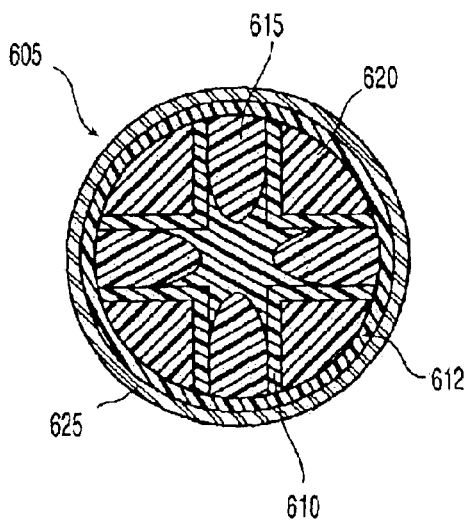

Referring to FIG. 8, another embodiment of the golf ball 605 is shown. Similar structures to those discussed above use the same reference number preceded with the numeral "6." The golf ball 605 includes an intermediate layer 612 disposed between the cover 625 and the inner core 610 and outer cores 615 and 620. The intermediate layer 612 is formed of either outer core material, cover material, or a different material. The first section 615 and the second section 620 of the outer core are formed of materials with the same material properties. However, in another embodiment, sections 615 and 620 can be formed of different materials. The intermediate layer 612 covers the inner core 610, outer core 615 and 620, and forms a continuous layer beneath the cover 625.

Figure 9:
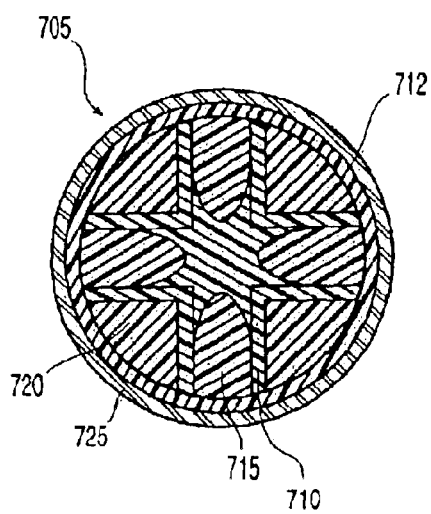

Referring to FIG. 9, another embodiment of the golf ball 705 is shown. Similar structures to those discussed above use the same reference number preceded with the numeral "7." The golf ball 705 includes an intermediate layer 712 disposed between the cover 725 and the inner core 710 and outer cores 715 and 720. The intermediate layer 712 is formed of either outer core material, cover material or a different material. The first section 715 and the second section 720 of the outer core are formed of materials with different material properties. The intermediate layer 712 covers the inner core 710, outer core 715 and 720, and forms a continuous layer beneath the cover 725.

Figure 10:
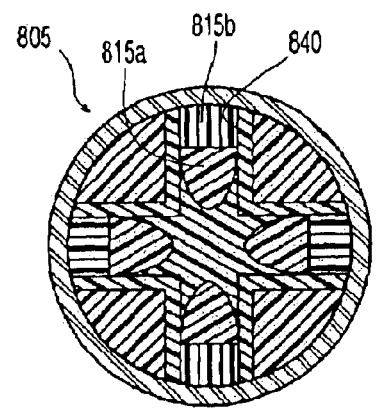

Referring to FIG. 10, another embodiment of the golf ball 805 is shown. Similar structures to those discussed above use the same reference number preceded with the numeral "8." The golf ball 805 includes an outer core with a multi-material first section 815a and 815b disposed within the gaps 840. The different portions 815a, 815b of the first section of the outer core are formed of two materials with different material properties.

In other embodiments, additional layers may be added to those mentioned above or the existing layers may be formed by multiple materials.

Figure 11:
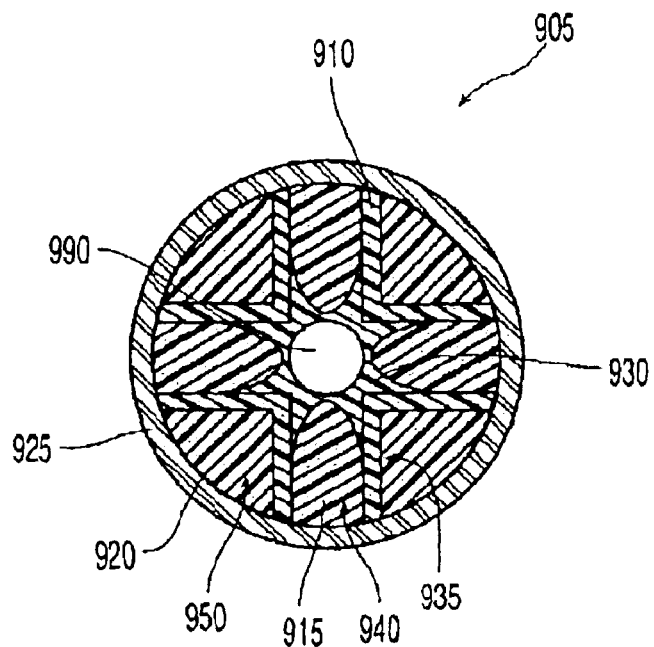

Referring to FIG. 11, another embodiment of the golf ball 905 is shown. Similar structures to those discussed above use the same reference number preceded with the numeral "9." The golf ball 905 includes an inner core 910 including a central portion 930 and a plurality of outwardly radially extending projections 935. The central portion 930 is hollow to define a chamber 990 therein. The outer core is formed from a first section 915 disposed within the gaps 940, and a second section 920 disposed within the recesses 950. The first section and the second section are formed of material with the same material properties. The cover section 925 surrounds the outer core 915 and 920. The hollow central portion 930 reduces the volume of the inner core 910 material. The central portion may include a fluid.

Figure 12:
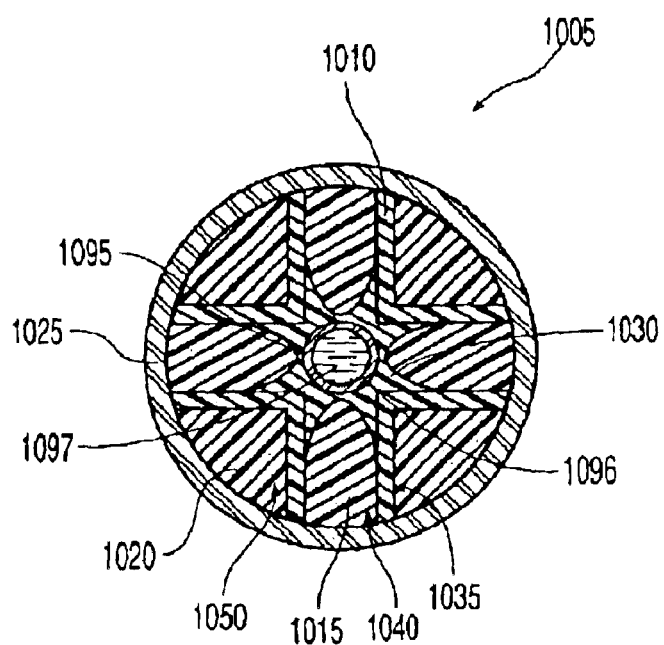

Referring to FIG. 12, another embodiment of the golf ball 1005 is shown. Similar structures to those discussed above use the same reference number preceded with the numeral "10." The golf ball 1005 includes an inner core 1010 and an outer core 1015, 1020. The inner core 1010 includes a central portion 1030 and a plurality of outwardly radially extending projections 1035. The central portion 1030 is hollow and surrounds a fluid-filled center 1095. The fluid-filled center 1095 is formed of an envelope 1096 containing a fluid 1097. The outer core is formed from a first section 1015 disposed within the gaps 1040, and a second section 1020 disposed within the recesses 1050. The first section and the second section are formed of material with the same material properties. The cover material 1025 surrounds the inner and outer cores.

Referring to FIG. 12, when the core is formed with a fluid-filled center 1095, the center is formed first then the inner core 1020 is molded around the center. Conventional molding techniques can be used for this operation. Then the outer core 1015, 1020 and cover 1025 are formed thereon, as discussed above.

Referring to FIGS. 11 and 12, the fluid within the inner core can be a wide variety of materials including air, water solutions, liquids, gels, foams, hot-melts, other fluid materials and combinations thereof. The fluid is varied to modify the performance parameters of the ball, such as the moment of inertia or the spin decay rate.

Examples of suitable liquids include either solutions such as salt in water, corn syrup, salt in water and corn syrup, glycol and water or oils. The liquid can further include pastes, colloidal suspensions, such as clay, barytes, carbon black in water or other liquid, or salt in water/glycol mixtures. Examples of suitable gels include water gelatin gels, hydrogels, water/methyl cellulose gels and gels comprised of copolymer rubber based materials such a styrene-butadiene-styrene rubber and paraffinic and/or naphthenic oil. Examples of suitable melts include waxes and hot melts. Hot-melts are materials which at or about normal room temperatures are solid but at elevated temperatures become liquid. A high melting temperature is desirable since the liquid core is heated to high temperatures during the molding of the inner core, outer core, and the cover. The liquid can be a reactive liquid system, which combines to form a solid. Examples of suitable reactive liquids are silicate gels, agar gels, peroxide cured polyester resins, two part epoxy resin systems and peroxide cured liquid polybutadiene rubber compositions.

Figure 13:
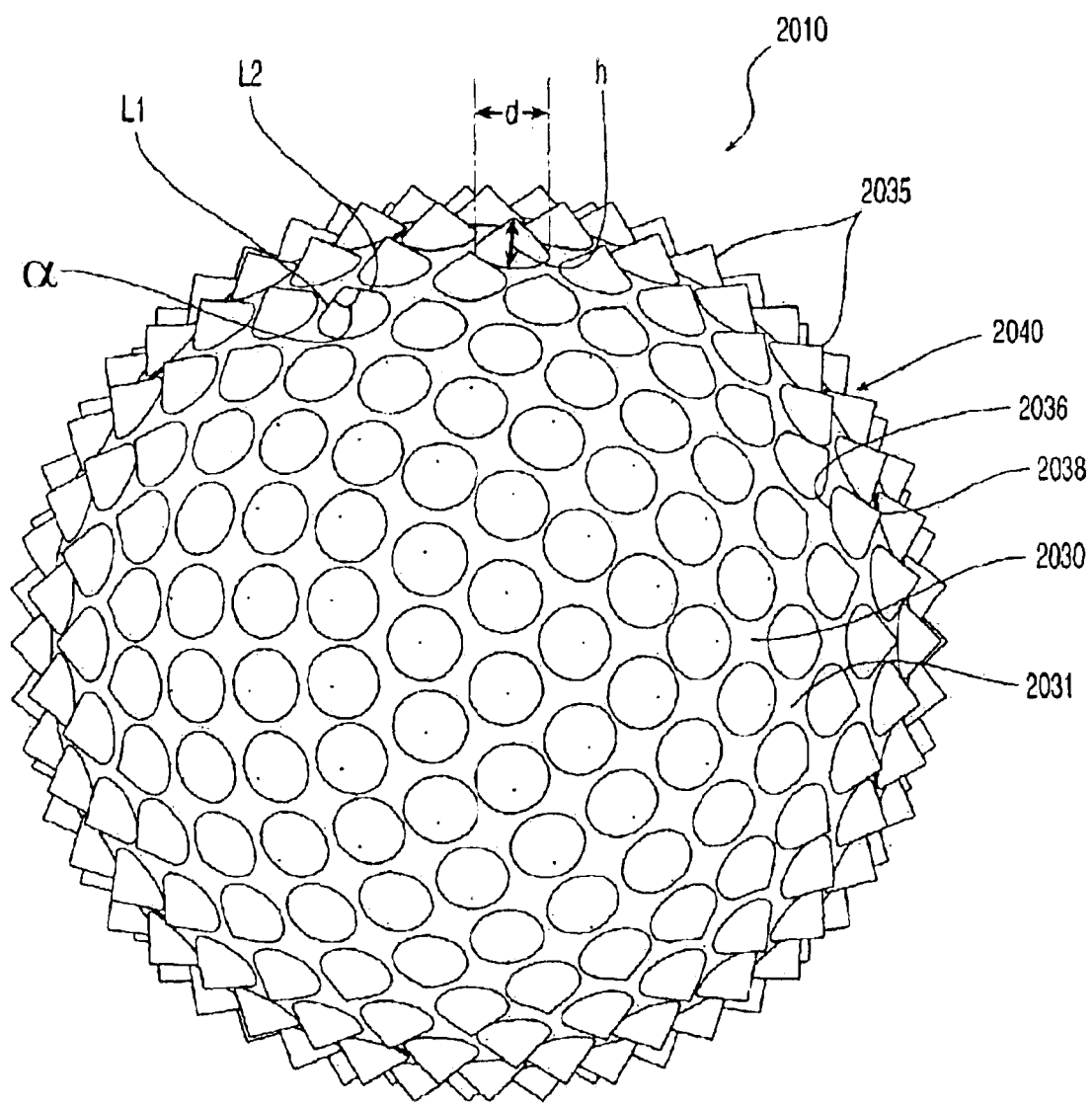
FIG. 13 is a perspective view of another embodiment of the inner core according to the present invention.

Referring to FIG. 13, another embodiment of an inner core 2010 is shown. The inner core 2010 includes a spherical central portion 2030 having an outer surface 2031, and a plurality of projections 2035 extending radially outwardly from the central portion 2030. The projections 2035 include a base 2036 adjacent the outer surface 2031 and a pointed free end 2038. The projections 2035 are substantially conical and taper from the base 2036 to the pointed free end 2038. It is preferred that the bases cover greater than about 15% of the outer surface. More preferably, the bases should cover greater than about 50% of the outer surface. Most preferably, the bases should be circular in shape and cover greater than about 80% of the outer surface and less than about 85%. As a result, the projections 2035 are spaced from one another and the area of the outer surface 2031 between each projection base 2036 is less than the area of each base. The projections 2035 are conical and configured so that the free ends 2038 of the projections form a spheroid. The base can have other shapes, such as polygons. Examples of polygon shapes that can be used for the base are triangles, pentagons, and hexagons. In addition, instead of the projections having a circular cross-section they can have other cross-sectional shapes such as square.

The projections further include a base diameter, designated by the letter d, and a projection height, designated by the letter h. It is preferred that the base diameter d is greater than or equal to the projection height h. This allows an included angle α between two diametrically opposed sides of the projection, designated L1 and L2, to be about 60° or more. More preferably the angle α is about 90° or more and most preferably the angle α is about 135°. This allows a simple mold to be used from which the core can be extracted.

To form a golf ball with inner core 2010 an outer core, as discussed above, is disposed around the inner core 2010 so that the outer core material is disposed within the gaps 2040 and the outer surface of the outer core is substantially spherical. The materials for the inner and outer cores are as discussed above. Then, the cover is formed thereon. The outer surface of the inner core has non-uniform radial distances from the center to various locations on the outer surface due to the conical projections 2035.

Figure 14:
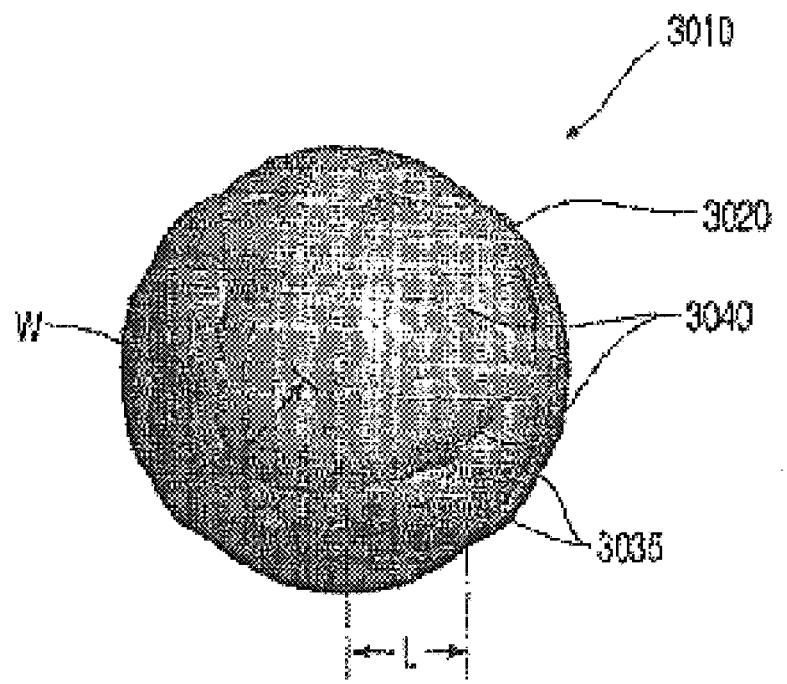
FIG. 14 is a side view of another embodiment of the inner core according to the present invention.

Referring to FIG. 14, another embodiment of an inner core 3010 is shown. The inner core outer surface 3020 includes a plurality of projections 3035 formed so that gaps 3040 are formed surrounding each projection and between projections. Each projection includes a maximum length, which is the longest length of the projection, designated L. Each projection also includes a maximum width, which is the widest width of the projection, designated W. The surface of the projection is curved along the length L and width W. A substantial number of projections have the maximum length greater than the maximum width so that the projections are elongated. To form a golf ball, an outer core, as discussed above, is disposed around the inner core 3010 so that the outer core material is disposed within the gaps. The outer core material forms a substantially spherical surface. The materials for the inner and outer cores are as discussed above. Then a cover is formed thereon. The outer surface of the inner core has non-uniform radial distances from the center due to the projections and the indentations.

In this embodiment, in order to form the outer surface of this inner core, first, second and third surfaces are formed by rotation of a wave form about first, second and third axes, respectively. These axii are the x-, y- and z-axii in a Cartesian Coordinate System. The wave form used is sine wave. However, other wave forms can be used including, but not limited to, cosine or saw-tooth wave forms.

Figure 15:
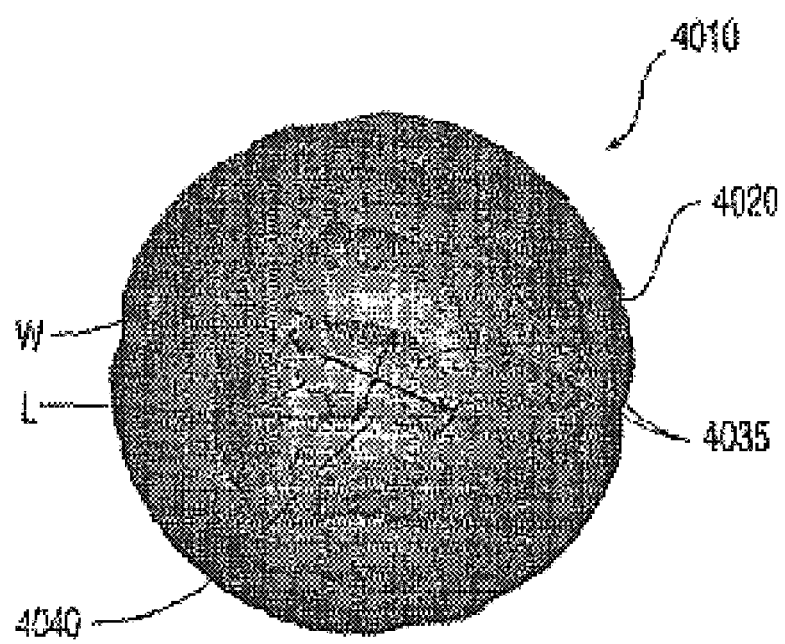
FIG. 15 is a side view of another embodiment of the inner core according to the present invention.

Referring to FIG. 15, an inner core 4010, similar to that shown in FIG. 14, is illustrated. The inner core outer surface 4020 includes a plurality of projections 4035 formed so that gaps 4040 are formed surrounding each projection and between projections. Each projection includes a maximum length, which is the longest length of the projection, designated L. Each projection also includes a maximum width, which is the widest width of the projection, designated W. The surface of the projection is curved along the length L and width W. A substantial number of projections have the maximum length greater than the maximum width so that the projections are elongated.

In this embodiment, in order to form the outer surface of this inner core, the first, second, and third surfaces are formed as discussed above, and a fourth surface that is formed by rotating the wave form about a fourth axis that is about 45° from the first and second axii. The surface of the inner core 4020 is formed by the intersection of the first, second, third and fourth surfaces. Any number of surfaces greater than three can be used to create different outer surface geometries for the inner core. Furthermore, different axii can also be used.

In all the embodiments, there is a characteristic of the core that is called the "transition volume," which will now be discussed. Referring to FIG. 4, the ball 5 has a radius $r_{IC}$ that includes only inner core material. The ball further an outer core and inner core radius $r_{OCIC}$ that includes both the inner core material and the outer core material. A transition radius is the outer core and inner core radius $r_{OCIC}$ less the inner core radius $r_{IC}$. The transition volume is the volume that is calculated when the transition radius is used. Thus, the transition volume is the volume of the golf ball that contains both inner core and outer core material therein, and it is an annular sector. The total volume of the core is the volume of all of the inner core material plus the volume of all of the outer core material. Favorable cores have been formed when the transition volume is at least 10% of the total core volume.

The "effective compression constant," which is designated EC, is the ratio of deflection of a 1.50 inch diameter sphere made of any single material used in the core under a 100 kg load that as represented by the formula EC=F/d, where, F is a 100 kg load; and d is the deflection in millimeters.

If the sphere tested is only inner core material, the effective compression constant for the inner core material alone is designated $EC_{IC}$. If the sphere tested is only outer core material, the effective compression constant for the outer core material alone is designated $EC_{OC}$. The sum of the constants for the inner core $EC_{IC}$ and outer core $EC_{OC}$ is the constant $EC_S$. If the sphere tested is inner and outer core material, the core effective compression constant is designated $EC_C$.

It is has been determined that very favorable cores are formed when their core effective compression constant $EC_C$ is less than the sum of the effective compression constants of the inner core and outer core $EC_S$. It is recommended that the core effective compression constant $EC_C$ is less than about 90% of the sum of the effective compression constants of the inner core and outer core $EC_S$. More preferably, the core effective compression constant $EC_C$ is less than or equal to about 50% of the sum of the effective compression constants of the inner core and outer core $EC_S$. The ratios of the inner core material to outer core material and the geometry of the inner core to the outer core are selected to achieve these core effective compression constants.

The resultant golf balls typically have a coefficient of restitution of greater than about 0.7, preferably greater than about 0.75, and more preferably greater than about 0.78. The golf balls also typically have an Atti compression of at least about 40, preferably from about 50 to 120, and more preferably from about 60 to 100. The golf ball cured polybutadiene material typically has a hardness of at least about 15 Shore A, preferably between about 30 Shore A and 80 Shore D, more preferably between about 50 Shore A and 60 Shore D.

In addition to the HNP's neutralized with organic fatty acids and salts thereof, core compositions may comprise at least one rubber material having a resilience index of at least about 40. Preferably the resilience index is at least about 50. Polymers that produce resilient golf balls and, therefore, are suitable for the present invention, include but are not limited to CB23, CB22, commercially available from of Bayer Corp. of Orange, Tex., BR60, commercially available from Enichem of Italy, and 1207G, commercially available from Goodyear Corp. of Akron, Ohio.

Additionally, the unvulcanized rubber, such as polybutadiene, in golf balls prepared according to the invention typically has a Mooney viscosity of between about 40 and about 80, more preferably, between about 45 and about 65, and most preferably, between about 45 and about 55. Mooney viscosity is typically measured according to ASTM-D1646.

When golf balls are prepared according to the invention, they typically will have dimple coverage greater than about 60 percent, preferably greater than about 65 percent, and more preferably greater than about 75 percent. The flexural modulus of the cover on the golf balls, as measured by ASTM method D6272-98, Procedure B, is typically greater than about 500 psi, and is preferably from about 500 psi to 150,000 psi. As discussed herein, the outer cover layer is preferably formed from a relatively soft polyurethane material. In particular, the material of the outer cover layer should have a material hardness, as measured by ASTM-D2240, less than about 45 Shore D, preferably less than about 40 Shore D, more preferably between about 25 and about 40 Shore D, and most preferably between about 30 and about 40 Shore D. The casing preferably has a material hardness of less than about 70 Shore D, more preferably between about 30 and about 70 Shore D, and most preferably, between about 50 and about 65 Shore D.

In a preferred embodiment, the intermediate layer material hardness is between about 40 and about 70 Shore D and the outer cover layer material hardness is less than about 40 Shore D. In a more preferred embodiment, a ratio of the intermediate layer material hardness to the outer cover layer material hardness is greater than 1.5.

It should be understood, especially to one of ordinary skill in the art, that there is a fundamental difference between "material hardness" and "hardness, as measured directly on a golf ball." Material hardness is defined by the procedure set forth in ASTM-D2240 and generally involves measuring the hardness of a flat "slab" or "button" formed of the material of which the hardness is to be measured. Hardness, when measured directly on a golf ball (or other spherical surface) is a completely different measurement and, therefore, results in a different hardness value. This difference results from a number of factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other.

In one embodiment, the core of the present invention has an Atti compression of between about 50 and about 90, more preferably, between about 60 and about 85, and most preferably, between about 65 and about 85. The overall outer diameter ("OD") of the core is less than about 1.590 inches, preferably, no greater than 1.580 inches, more preferably between about 1.540 inches and about 1.580 inches, and most preferably between about 1.525 inches to about 1.570 inches. The OD of the casing of the golf balls of the present invention is preferably between 1.580 inches and about 1.640 inches, more preferably between about 1.590 inches to about 1.630 inches, and most preferably between about 1.600 inches to about 1.630 inches.

The present multilayer golf ball can have an overall diameter of any size. Although the United States Golf Association ("USGA") specifications limit the minimum size of a competition golf ball to 1.680 inches. There is no specification as to the maximum diameter. Golf balls of any size, however, can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches.

The golf balls of the present invention should have a moment of inertia ("MOI") of less than about 85 and, preferably, less than about 83. The MOI is typically measured on model number MOI-005-104 Moment of Inertia Instrument manufactured by Inertia Dynamics of Collinsville, Conn. The instrument is plugged into a PC for communication via a COMM port and is driven by MOI Instrument Software version #1.2.

U.S. Pat. Nos. 6,193,619; 6,207,784; and 6,221,960, and U.S. application Ser. Nos. 09/594,031, filed Jun. 15, 2000; 09/677,871, filed Oct. 3, 2000, and 09/447,652, filed Nov. 23, 1999, are incorporated in their entirety herein by express reference thereto.

The highly-neutralized polymers of the present invention may also be used in golf equipment, in particular, inserts for golf clubs, such as putters, irons, and woods, and in golf shoes and components thereof.

As used herein, the term "about," used in connection with one or more numbers or numerical ranges, should be understood to refer to all such numbers, including all numbers in a range.

The invention described and claimed herein is not to be limited in scope by the specific embodiments herein disclosed, since these embodiments are intended solely as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising:
   an inner core formed of a first material and comprising:
      i) a central portion; and
      ii) a plurality of spaced projections extending radially outward from the central portion forming gaps between each projection, and each projection having an enlarged free end and a generally conical shape;
   an outer core formed of a second material, said second material being disposed within the gaps to form a core; and
   a cover layer;
   wherein at least one of the first and second materials comprises a first polymer containing an acid group neutralized by a salt of an organic acid, a cation source, or a suitable base of the organic acid, the salt of the organic acid, the cation source, or the suitable base of the organic acid being present in an amount sufficient to neutralize the polymer by no less than about 100%.

2. The golf ball of claim 1, wherein the first polymer is blended with a second polymer, wherein the second polymer comprises ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, or cationic ionomers.

3. The golf ball of claim 1, wherein the organic acid is selected from the group consisting of aliphatic organic acids, aromatic organic acids, saturated mono-functional organic acids, unsaturated mono-functional organic acids, and multi-unsaturated mono-functional organic acids.

4. The golf ball of claim 1, wherein the salt of organic acids comprises the salts of barium, lithium, sodium, zinc, bismuth, chromium, cobalt, copper, potassium, strontium, titanium, tungsten, magnesium, cesium, iron, nickel, silver, aluminum, tin, and calcium.

5. The golf ball of claim 1, wherein the spaced projections are configured to from an octet skeletal sphere.

6. The golf ball of claim 1, wherein the golf ball further comprises intermediate layer disposed between the outer core and inner core or the cover layer.

7. The golf ball of claim 6, wherein the intermediate layer forms a continuous layer beneath the cover layer.

8. The golf ball of claim 1, wherein the first and second materials have substantially different material properties.

9. The golf ball of claim 1, wherein the first material has a first Shore D hardness and a first flexural modulus less and the second material has a second Shore D hardness and a second flexural modulus greater than the first.

10. The golf ball of claim 1, wherein the first material has a Shore D hardness between about 30 and about 80 and an elastic modulus between about 5,000 psi and about 100,000 psi.

11. The golf ball of claim 1, wherein the first material comprises the fully-neutralized polymer and the second material comprises thermoset materials selected from the group consisting of rubbers, polybutadienes, and polyisoprenes; thermoplastic materials selected from the group consisting of ionomers, polyamides, polyesters, and thermoplastic elastomers; or castable materials selected from the group consisting of urethanes, ureas, epoxies, diols, and curatives.

12. The golf ball of claim 1, wherein the inner or outer core has a diameter of about 1.58 inches or greater.

13. The golf ball of claim 1, wherein the cover is comprised of a castable reactive liquid material.

14. The golf ball of claim 1, wherein the cover is cast or reaction injection molded over the core.

15. The golf ball of claim 1, wherein the cover is comprised of a polyurethane, a polyurea, or a hybrid of both.

16. A golf ball comprising:
   an inner core of a thermoset rubber and comprising:
      a spherical central portion having an outer surface; and
      a plurality of projections extending radially outward from the central portion, said projections having a base adjacent the outer surface, a free end, and each projection tapers from the base toward the free end, and each base being circular or conical, and each base having a diameter greater than the height of the projection;
   a non-wound outer core comprised of a polymer neutralized with a salt of an organic acid, a cation source, or a suitable base of the organic acid, the salt of organic acid, the cation source, or the suitable base of the organic acid being present in an amount greater than about 10 weight percent such that the polymer is fully neutralized, and being disposed around the inner core to form a core so that the outer surface of the outer core has a compression of less than or equal to about 90 and a diameter of about 1.53 inches or greater; and
   a cover surrounding the inner core and the outer core, the cover comprising a castable reactive liquid material.

17. The golf ball of claim 16, wherein the bases cover greater than about 15% of the outer surface.

18. The golf ball of claim 16, wherein the bases cover greater than about 50% of the outer surface.

19. The golf ball of claim 16, wherein the bases cover greater than about 80% of the outer surface.

20. A golf ball comprising:
   an inner core comprised of a first polymer neutralized with a salt of an organic acid, a cation source, or a suitable base of the organic acid, the organic acid salt the cation source, or the suitable base of the organic acid being present in an amount greater than about 10 weight percent such that the polymer is fully neutralized and including a substantially spherical outer surface that includes a plurality of projections formed so that gaps are formed surrounding each projection, and the projections having a maximum length greater than the maximum width;

an outer core formed of a second material and being disposed around the inner core to form a core; and a cover surrounding the outer core.

21. The golf ball of claim 20, wherein the surface of the inner core is described by the intersection of a first surface, a second surface, and a third surface, the first surface being formed by rotation of a wave form about a first axis, the second surface being formed by rotation of the wave form about a second axis, and the third surface being formed by rotation of a wave form about a third axis.

22. The golf ball of claim 21, wherein the surface of the inner core is described by the intersection of the first surface, the second surface, the third surface, and a fourth surface, the fourth surface being formed by rotation of the wave form about a fourth axis that is about 45° between the first and second axii.

23. The golf ball of claim 20, wherein the first polymer is blended with a second polymer, wherein the second polymer comprises ionomeric copolymers and terpolymers, ionomer precursors, thermoplastics, thermoplastic elastomers, polybutadiene rubber, balata, grafted metallocene-catalyzed polymers, non-grafted metallocene-catalyzed polymers, single-site polymers, high-crystalline acid polymers, or cationic ionomers.

24. The golf ball of claim 23, wherein the second polymer is neutralized by a salt of an organic acid, a cation source, or a suitable base of the organic acid, the organic acid salt, the cation source, or the suitable base of the organic acid being present in an amount sufficient to neutralize the second material by at least about 90%.

25. The golf ball of claim 24, wherein the second polymer is neutralized by no less than about 100%.

26. A golf ball comprising:

an inner core comprised of a polymer neutralized with a salt of an organic acid, a cation source, or a suitable base of the organic acid, the organic acid salt, the cation source, or the suitable base of the organic acid being present in amount greater than about 10 weight percent such that the polymer is fully neutralized and including a substantially spherical outer surface that includes a plurality of projections formed so that gaps are formed surrounding each projection, and the projections having a maximum length greater than the maximum width;

an outer core formed of a second material and being disposed around the inner core to form a core; and a cover surrounding the outer core;

wherein the core has an effective compression constant less than a sum of an inner core effective compression constant and an outer core effective compression constant.

* * * * *